(12) United States Patent
James et al.

(10) Patent No.: US 10,419,320 B2
(45) Date of Patent: *Sep. 17, 2019

(54) INFRASTRUCTURE RESOURCE MANAGEMENT SYSTEM

(71) Applicant: Microsoft Technology Licensing, LLC, Redmond, WA (US)

(72) Inventors: Sean Michael James, Olympia, WA (US); David Thomas Gauthier, Seattle, WA (US); Eric Clarence Peterson, Woodinville, WA (US); Lucas Neal Joppa, Sammamish, WA (US); Ranveer Chandra, Kirkland, WA (US); Teddy L. Bennett, Kirkland, WA (US); Todd R. Rawlings, Bellevue, WA (US); Brian A. Janous, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

This patent is subject to a terminal disclaimer.

(21) Appl. No.: 15/199,964

(22) Filed: Jun. 30, 2016

(65) Prior Publication Data

US 2018/0006966 A1  Jan. 4, 2018

(51) Int. Cl.
*H04L 12/26* (2006.01)
*G05B 15/02* (2006.01)
(Continued)

(52) U.S. Cl.
CPC .............. *H04L 43/16* (2013.01); *G05B 11/01* (2013.01); *G05B 15/02* (2013.01); *G05F 1/66* (2013.01);
(Continued)

(58) Field of Classification Search
CPC .. H02J 3/14; H02J 13/00; H02J 13/001; H02J 13/0013; H02J 13/0062; H02J 13/0072;
(Continued)

(56) References Cited

U.S. PATENT DOCUMENTS 6,577,962 B1   6/2003   Afshari
7,489,990 B2   2/2009   Fehr et al.
(Continued)

FOREIGN PATENT DOCUMENTS

CN   102014165 A   4/2011
CN   203302090 U   11/2013
(Continued)

OTHER PUBLICATIONS

"Aerial Photography", Retrieved from <<https://web.archive.org/web/20140920071036/http://www.microdrones.com/en/applications/areas-of-application/aerial-photography/>>, Sep. 8, 2014, 3 Pages.
(Continued)

*Primary Examiner* — Crystal J Barnes-Bullock
(74) *Attorney, Agent, or Firm* — Liang IP, PLLC

(57) ABSTRACT

Various methods and systems for implementing resource management for an infrastructure are provided. Resource management includes datacenter byproduct management interfaces, datacenter power management, datacenter operations optimization and infrastructure resource management. Resource management facilitates using and distributing physical resources, including incidental physical resources that are generated during operation of an infrastructure, based on a minimum threshold reserve of the physical resource associated with the operating the infrastructure. Resource management can include controlling an amount of the physical resource that is generated and an amount the physical resource that is reserved. The minimum threshold reserve in combination with the control over generating and reserving the physical resource help identify an allocable amount of the physical resource. Physical resources of an infrastructure are quantified to support resource management. Quantifying physical resources is associated with devices of the infrastructure and requests for physical (Continued)

resources in the infrastructure to perform different types of operations.

19 Claims, 10 Drawing Sheets

(51) Int. Cl.
| | |
|---|---|
| *G05F 1/66* | (2006.01) |
| *G05B 11/01* | (2006.01) |
| *G06Q 50/06* | (2012.01) |
| *H04L 12/911* | (2013.01) |

(52) U.S. Cl.
CPC ......... *G06Q 50/06* (2013.01); *H04L 43/0876* (2013.01); *H04L 47/70* (2013.01); *Y04S 40/168* (2013.01)

(58) Field of Classification Search
CPC .. H02J 13/0075; H04L 12/2825; H04L 43/16; H04L 43/165; H04L 47/821; G05B 11/01; G05B 15/02; G05B 2219/25352; G05B 2219/2642; G05F 1/66; G06Q 50/06; G06F 1/266; Y02B 70/3216; Y02B 70/3225; Y02B 70/3241; Y02B 90/222; Y02B 90/2638; Y02E 10/563; Y02E 40/72; Y02E 60/724; Y02E 60/7807; Y02E 70/30; Y04S 10/12; Y04S 10/18; Y04S 10/40; Y04S 10/60; Y04S 20/221; Y04S 20/222; Y04S 20/227; Y04S 40/12; Y04S 40/124
See application file for complete search history.

(56) References Cited

U.S. PATENT DOCUMENTS

| | | | |
|---|---|---|---|
| 7,742,830 B1 | 6/2010 | Botes | |
| 8,429,630 B2* | 4/2013 | Nickolov | G06F 9/4856 717/110 |
| 8,522,569 B2 | 9/2013 | Avery et al. | |
| 8,548,640 B2 | 10/2013 | Belady et al. | |
| 8,588,989 B1 | 11/2013 | Heath et al. | |
| 8,645,150 B2 | 2/2014 | Akers et al. | |
| 8,736,109 B2 | 5/2014 | Park | |
| 8,904,209 B2 | 12/2014 | Davis et al. | |
| 8,983,669 B2* | 3/2015 | Forbes, Jr. | G05F 1/66 700/286 |
| 9,003,216 B2 | 4/2015 | Sankar et al. | |
| 9,063,525 B2* | 6/2015 | Sanders | G05B 11/01 |
| 9,159,042 B2 | 10/2015 | Steven et al. | |
| 9,207,698 B2* | 12/2015 | Forbes, Jr. | H02J 3/14 |
| 9,515,491 B2* | 12/2016 | Bhageria | H02J 4/00 |
| 9,568,910 B2* | 2/2017 | Drees | G05B 15/02 |
| 9,740,227 B2* | 8/2017 | Forbes, Jr. | G05F 1/66 |
| 9,754,330 B2* | 9/2017 | Kitagishi | G06Q 50/06 |
| 9,960,637 B2* | 5/2018 | Sanders | H02J 3/381 |
| 9,985,848 B1* | 5/2018 | Ward, Jr. | H04L 41/5045 |
| 10,048,732 B2* | 8/2018 | James | G06F 1/266 |
| 10,057,185 B1* | 8/2018 | Burgin | H04L 47/781 |
| 2003/0061091 A1 | 3/2003 | Amaratunga et al. | |
| 2008/0184230 A1 | 7/2008 | Leech et al. | |
| 2010/0050000 A1 | 2/2010 | Odlund | |
| 2010/0191998 A1 | 7/2010 | Moore | |
| 2010/0218108 A1* | 8/2010 | Crabtree | G06Q 50/06 715/738 |
| 2010/0251789 A1 | 10/2010 | Baird | |
| 2011/0071867 A1 | 3/2011 | Chen et al. | |
| 2011/0316337 A1 | 12/2011 | Pelio et al. | |
| 2012/0053925 A1 | 3/2012 | Geffin et al. | |
| 2012/0054125 A1* | 3/2012 | Clifton | G05B 15/02 705/412 |
| 2013/0054987 A1 | 2/2013 | Pfeiffer et al. | |
| 2013/0111494 A1 | 5/2013 | Hyser et al. | |
| 2013/0116803 A1 | 5/2013 | Gmach et al. | |
| 2013/0219066 A1 | 8/2013 | Arroyo et al. | |
| 2013/0318371 A1 | 11/2013 | Hormuth | |
| 2013/0328395 A1 | 12/2013 | Krizman et al. | |
| 2014/0208130 A1 | 7/2014 | Morales et al. | |
| 2015/0134135 A1* | 5/2015 | Wong | H02J 3/38 700/295 |
| 2015/0144562 A1 | 5/2015 | Constantz | |
| 2015/0213387 A1 | 7/2015 | Sankar et al. | |
| 2016/0370843 A1 | 12/2016 | Gatson et al. | |
| 2018/0004265 A1* | 1/2018 | James | G06F 1/266 |
| 2018/0006964 A1* | 1/2018 | Joppa | H04L 47/82 |
| 2018/0006965 A1* | 1/2018 | Rawlings | H04L 47/821 |
| 2018/0188790 A1* | 7/2018 | Griffith | H04B 3/546 |

FOREIGN PATENT DOCUMENTS

| | | |
|---|---|---|
| EP | 2135148 A2 | 12/2009 |
| KR | 101081486 B1 | 11/2011 |
| WO | 2011135375 A1 | 11/2011 |
| WO | 2013130557 A1 | 9/2013 |

OTHER PUBLICATIONS

"Apple Facilities", Retrieved from <<http://www.apple.com/environment/pdf/Apple_Facilities_Report_2013.pdf>>, Retrieved on: Oct. 7, 2015, 16 Pages.

"Harvest Geek", Retrieved from <<https://web.archive.org/web/20140218173227/http://www.harvestgeek.com/howitworks>>, Feb. 24, 2013, 4 Pages.

"PIX4D", Retrieved from <<https://web.archive.org/web/20141106102906/http://pix4d.com/>>, Nov. 2, 2014, 3 Pages.

"The Lancaster Platform", Retrieved from <<https://web.archive.org/web/20140709013352/http://www.precisionhawk.com/>>, Apr. 23, 2014, 9 Pages.

"ThingWorx", Retrieved from <<https://web.archive.org/web/20160130023740/http://www.thingworx.com/news/thingworx-powers-first-cloud-based-smart-agriculture-solution>>, Jul. 26, 2012, 4 Pages.

"What is a Mapping Drone, and Why Use One", Retrieved from <<https://web.archive.org/web/20141016064406/http://3drobotics.com/mapping-drones/?>>, Oct. 16, 2014, 7 Pages.

"Non Final Office Action Issued in U.S. Appl. No. 15/199,961", dated Dec. 6, 2017, 5 Pages.

Adnan, Muhammad Abdullah, "Research—Muhammad Abdullah Adnan", Retrieved from <<https://sites.google.com/site/abdullahadnan/research>>, Dec. 13, 2010, 4 Pages.

Boughton, Ben, "Unmanned Aerial Vehicles (UAV) in Precision Agriculture", Retrieved from <<http://agmapsonline.com/?p=624>>, Jan. 6, 2014, 9 Pages.

Bouley, Dennis, "Estimating a Data Center's Electrical Carbon Footprint", In White Paper of APC, May 2012, 13 Pages.

Doyle, et al., "Server Selection for Carbon Emission Control", In Proceedings of the 2nd ACM SIGCOMM Workshop on Green Networking, Aug. 19, 2011, 6 Pages.

Ebrahimi, et al., "A Review of Data Center Cooling Technology, Operating Conditions and the Corresponding Low-Grade Waste Heat Recovery Opportunities", In Journal of Renewable and Sustainable Energy Reviews, vol. 31, Mar. 2014, pp. 622-638.

Gmach, et al., "Capacity Planning and Power Management to Exploit Sustainable Energy", In Proceedings of the International Conference on Network and Service Management, Oct. 25, 2010, 8 Pages.

Kaewpuang, et al., "Adaptive Power Management for Data Center in Smart Grid Environment", In Proceedings of the IEEE 10th International Symposium on Parallel and Distributed Processing with Applications, Jul. 10, 2012, pp. 119-126.

Kozlowicz, Joe, "Three Ways Data Centers Can Build the Future of Electricity and Smart Grids", Retrieved from <<https://www.greenhousedata.com/blog/three-ways-data-centers-can-build-the-future-of-electricity-and-smart-grids>>, Aug. 5, 2014, 8 Pages.

Loke, Seng W., "The Internet of Flying-Things: Opportunities and Challenges with Airborne Fog Computing and Mobile Cloud in the Clouds", In Journal of the Computing Research Repository, Jul. 16, 2015, 5 Pages.

(56) References Cited

OTHER PUBLICATIONS

Miller, Rich, "Data Center Water Use Moves to the Forefront", Retrieved from <<http://www.datacenterknowledge.com/archives/2012/08/14/data-center-water-use-moves-to-center-stage/>>, Aug. 14, 2012, 5 Pages.

Myint, et al., "Resource Demand Prediction and Carbon Emission Estimation for Data Centers", In Proceedings of the Computer Science and Information Technology, vol. 2, Issue 2, Feb. 2014, pp. 72-78.

Sverdlik, Sverdlik, "Desalination Plant and Data Center: Not as Odd a Couple as May Seem", Retrieved from <<http://www.datacenterknowledge.com/archives/2014/08/25/a-desalination-plant-and-a-data-center-not-as-odd-of-a-couple-as-it-may-seem/>>, Aug. 25, 2014, 3 Pages.

"Non Final Office Action Issued in U.S. Appl. No. 15/199,959", dated Feb. 2, 2018, 14 Pages.

"Notice of Allowance Issued in U.S. Appl. No. 15/199,959", dated May 23, 2018, 9 Pages.

Wierman, et al., "Opportunities and Challenges for Data Center Demand Response", In Proceedings of International Green Computing Conference, Nov. 3, 2014, 10 Pages.

\* cited by examiner

INFRASTRUCTURE RESOURCE MANAGEMENT SYSTEM

CROSS-REFERENCE TO RELATED APPLICATIONS

This application is related by subject matter to following commonly assigned applications filed on even date herewith: U.S. application Ser. No. 15/199,959, entitled "DATACENTER BYPRODUCT MANAGEMENT INTERFACE SYSTEM" U.S. application Ser. No. 15/199,961, entitled "DATACENTER POWER MANAGEMENT SYSTEM" and U.S. application Ser. No. 15/199,963, entitled "DATACENTER OPERATIONS OPTIMIZATION SYSTEM." Each of the aforementioned applications is herein incorporated by reference in its entirety.

SUMMARY

Embodiments described herein provide methods and systems for implementing resource management for an infrastructure (e.g., a datacenter infrastructure). Resource management includes datacenter byproduct management interfaces, datacenter power management, datacenter operations optimization and infrastructure resource management. At a high level, resource management facilitates using physical resources, including incidental physical resources, that are generated during operation of an infrastructure based on a minimum threshold reserve of the physical resource associated with the operating the infrastructure. Resource management can include controlling an amount of the physical resource that is generated and an amount the physical resource that is reserved. The minimum threshold reserve in combination with the control over generating and reserving the physical resource help identify an allocable amount of the physical resource.

A resource management system facilitates defining and allocating resources associated with the infrastructure. In particular, the resource management system processes resources and requests for resources based on a resource management framework built on Application Programming Interfaces (API) and resource management components. Physical resources of an infrastructure can be quantified to support resource management. Quantifying physical resources can be associated with devices of the infrastructure and/or requests for physical resources in the infrastructure to perform operations. Requests for physical resources of the infrastructure can be received from external entities that need the physical resources.

In one embodiment, an instance (e.g., device instance) is a computed representation of an infrastructure device in relation to a physical resource (e.g., power, water, carbon dioxide and heat) and a reserve of the physical resource, where the instance supports determining allocable units of the physical resource. In another embodiment, an instance (e.g., operation instance) represents an amount of a physical resource needed to perform an anticipated operation; the instance is also used to determine allocable units of the physical resource. The resource management system can monitor physical resources and devices using device instances and allocate the physical resources based on operation instances. As such, the resource management system can communicate an amount of allocated units for a request of a physical resource based on an amount of units of the physical resource that is being generated and an amount of the physical resource that is reserved.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Embodiments are described in detail below with reference to the attached drawing figures, wherein.

DETAILED DESCRIPTION

Figure 1:
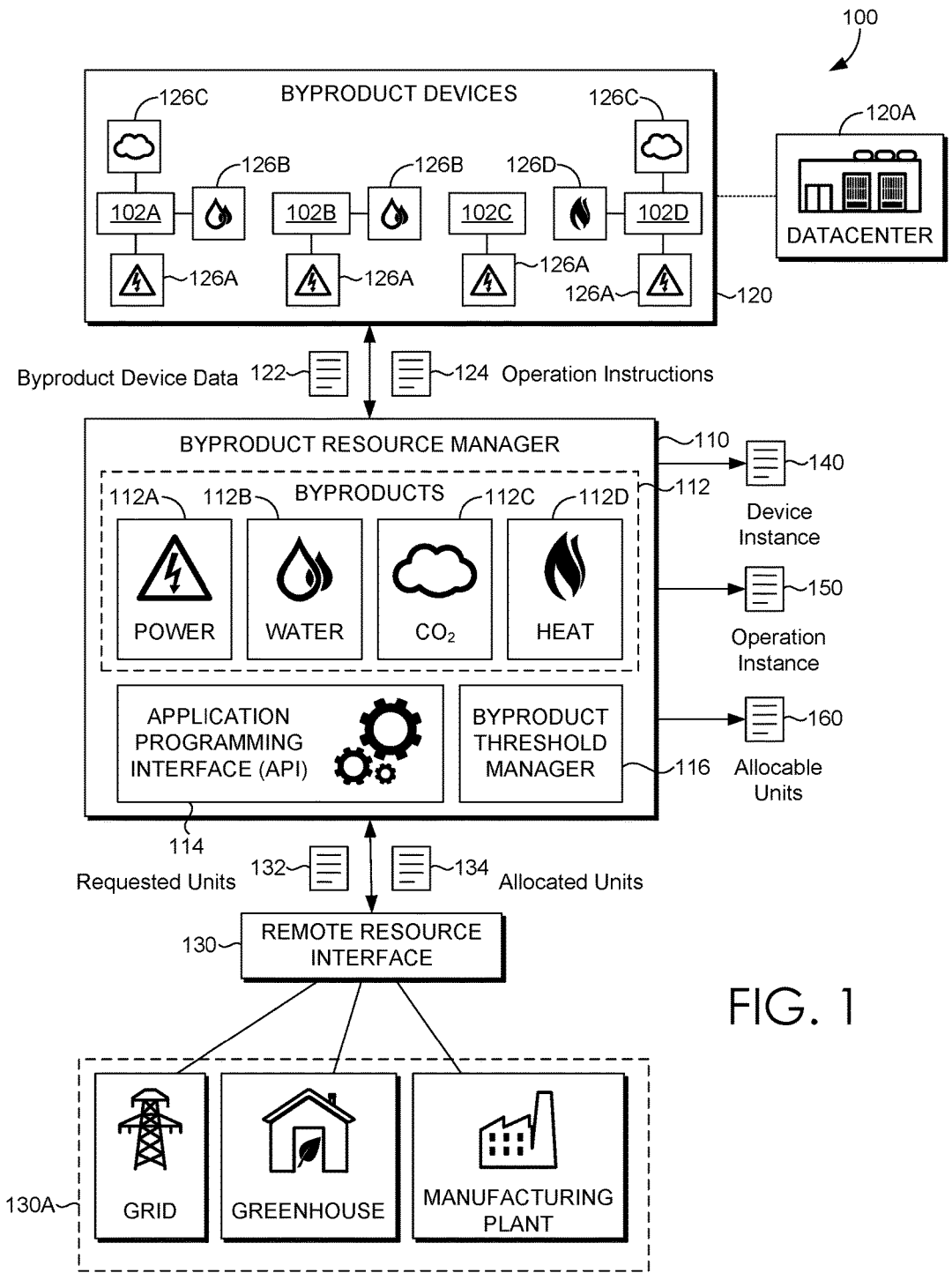
FIG. 1 is a block diagram of an exemplary distributed computing environment in which embodiments described herein may be employed.

Datacenters can provide housing for computing systems and associated components. The computing systems and components can support compute and storage operations for a variety of compute workloads and operations. Datacenters also include includes several devices or apparatus that consume and produce physical resources (e.g., power, water, heat and carbon dioxide). For example, large datacenters can use a significant amount of electrical power and water and produce heat and carbon dioxide.

A growing number of industries are utilizing datacenter resources, which has led to an ever-increasing amount of resource usage at datacenters and consequently the production of byproducts that can negatively impact the environment. As such, a comprehensive approach for operating datacenters for managing the increased use of resources, in particular physical resources, and controlling the increased production of byproducts can advantageously improve the operation of datacenters and reduce the negative consequences on the environment.

Embodiments described herein provide simple and efficient methods and systems for implementing resource management (e.g., datacenter byproduct management interfaces, datacenter power management, datacenter operations optimization, and infrastructure resource management) for infrastructures. At a high level, the resource management system provides a system for datacenter providers to operate datacenters with optimum efficiency, where efficient use of resources, especially physical resources, in a datacenter leads to achieving maximum productivity with minimum wasted resources. Also, the resource management system provides the capacity to leverage incidental and sometimes inevitable byproducts (i.e., physical resources as byproducts) of operating datacenter as resources in and around the datacenter. In some cases, byproducts may previously have been considered waste products of the datacenter. Nonetheless, the resource management system can efficiently generate, reserve, process, consume and distribute the byproduct physical resources of the datacenter. As such, the increased efficiency and usage of byproducts reduce the environmental impact of a datacenter operating based on the resource management system.

In operation, resource management facilitates using physical resources, including incidental physical resources, that are generated during operation of an infrastructure based on a minimum threshold reserve of the physical resource associated with the operating the infrastructure. Resource management can include controlling an amount of the physical resource that is generated and an amount the physical resource that is reserved. The minimum threshold reserve in combination with the control over generating and reserving the physical resource is used to identify an allocable amount of the physical resource.

The resource management system facilitates defining and allocating resources associated with the infrastructure. In particular, the resource management system processes resources and requests for resources based on a resource management framework built on Application Programming Interfaces (API) and resource management components. Physical resources of an infrastructure can be quantified to support resource management. Quantifying physical resources can be associated with devices of the infrastructure and/or requests for physical resources in the infrastructure to perform operations. Requests for physical resources of the infrastructure can be received from external entities that need the physical resources.

In one embodiment, an instance (e.g., device instance) is a computed representation of an infrastructure device in relation to a physical resource (e.g., power, water, carbon dioxide, heat) and a reserve of the physical resource, where the instance supports determining allocable units of the physical resource. In another embodiment, an instance (e.g., operation instance) represents an amount of a physical resource needed to perform an anticipated operation; the instance is also used to determine allocable units of the physical resource. The resource management system can monitor physical resources and devices using device instances and allocate the physical resources based on operation instances.

As such, the resource management system can communicate an amount of allocated units for a request of a physical resource based on an amount of units of the physical resource that is being generated and an amount of the physical resource that is reserved. The resource management system can support different types of implementations including: a datacenter byproduct management interface system, a datacenter power management system, a datacenter operations optimization system, and an infrastructure resource management system, as discussed in more detail below.

Datacenter Byproduct Management System

By way of example, for illustration of a first embodiment described herein, a datacenter can support a datacenter byproduct management system. The datacenter includes several types of devices. The devices operate to perform functions that support operations in the datacenter. For example, servers operate to provide compute resources or storage resources and a fan operates produce a current of air for cooling the datacenter. With the datacenter byproduct management system, datacenter devices can further be described as byproduct devices. A byproduct device consumes or supplies a specific byproduct—i.e., a physical resource (e.g., power, water, carbon dioxide—$CO_2$, heat) of the datacenter. The datacenter byproduct management system provides a comprehensive view of physical resources that are available at the datacenter. Physical resources can be generated intentionally or incidentally by the datacenter devices. In either case, the physical resource is tracked and can further be identified as an intentionally produced physical resource or an incidental physical resource. For example, an electrical device can produce electricity intentionally but generate heat and water incidentally. The datacenter byproduct management system operates to efficiently generate, reserve, use and distribute physical resources and in particular process and utilize byproduct physical resources that would other be regarded as waste. The datacenter byproduct management system can specifically rely on technology-based techniques for implementation of resource management.

The datacenter byproduct management system operates using an Application Programming Interface (API) that supports a protocol for performing operations based on byproduct resources. At a high level, the API allows the datacenter including datacenter devices and physical resources to be expressed in terms of operations, inputs, outputs, and underlying classification types for characteristics of the datacenter. The API can define functionalities that are independent of specific implementations, allowing definitions and implementations to vary without compromising interfaces. The API can support representing, processing and communicating information associated with the physical resources. Physical resources can be generated, reserved, allocated and communicated based the APIs of the datacenter byproduct management system. In particular, the API can define a byproduct device in relation to the physical resource and a reserve of the physical resource. Using the APIs and byproduct management system, a byproduct device can be identified and classified with one or more physical resources (e.g., power devices, water devices, $CO_2$ devices or heat devices). The APIs define units for quantifying the physical resource including a generation capacity of units of the physical resource by the byproduct device and reserve units of the physical resource associated with the byproduct device.

The datacenter byproduct management system also operates based on minimum threshold limits of physical resources associated with operating at least the datacenter. The minimum threshold limit of a physical resource can refer to a benchmark attribute for guidance on how much of the physical resource is needed to operate the datacenter. A breach of the minimum threshold can be configured to trigger remediation operations. The minimum threshold limit can be defined based on datacenter processes and performance metrics for the individual and combinations of physical resources. The minimum threshold limit of the physical resource can also be calculated and represented based on units defined in the API. The minimum threshold limit, quantified using the API, indicates an amount of the physical resource needed to operate the datacenter.

In operation, a byproduct resource manager of the datacenter byproduct management system can receive data for a byproduct device associated with the datacenter. It is contemplated that the byproduct resource manager continuously and automatically monitors byproduct devices and generates and updates device instances to provide a comprehensive view of physical resources. The byproduct resource manager can then use the data to generate a representation (e.g., device instance) byproduct device. In particular, a generation capacity of units of the physical resource and reserve units of the physical resource are identified. The device instance can be used to determine allocable units of the physical resource. The byproduct resource manager can specifically communicate with the byproduct device on an amount of units of the physical resource to be generated and an amount resource to be reserved based on the device instance and the minimum threshold limit of the physical resource.

An amount of allocated units can be identified from the allocable units and communicated as available for use. The amount of allocated units can be generated based on a request having requested units of a physical resource. A remote resource interface can communicate the request and the byproduct resource manager can identify allocable units and determine allocated units for the request. In one embodiment, the request can be used to generate an operation instance for processing the request with the same API-based representation of the device instance.

Datacenter Power Management System

By way of example, for illustration of a second embodiment described herein, a power management system is provided for leveraging power devices in a datacenter to support electrical infrastructures (e.g., a power grid). A datacenter can include several power devices (e.g., servers, racks hardware, network devices, batteries, etc.) that consume or supply power available at the datacenter. In one unique example, a power device can be an uninterruptable power supply (UPS) or a power generator. At a high level, the UPS can operate to consume power when charging batteries in the UPS and supply power stored in the batteries. The power generator in its own right operates to generate power.

The resource management APIs can provide a representation of power devices in the power management system. The resource management APIs can be configured to support representing electrical attributes associated with power devices and using the API representations (e.g., device instances, operation instances) that include the power device data to perform resource management. Sensors associated with power devices can help track electrical attributes represented using the APIs. Electrical attributes can refer to measureable electrical quantities that are parameters and operational characteristics of the electrical devices. Electrical attributes can include leading factor, lagging factor, reactive power, active power factor correction, power factor penalty, frequency firming, voltage correction, inductive loads, capacitive loads, phase correction and so on. In this regard, power device can be further associated with a power management scheme for electrical attributes of the power device. The power management scheme supports generating and reserving power based on corresponding electrical devices and electricity processing techniques associated with the power device. Using the APIs, the UPS, the generator and other power devices can be identified and classified as a power devices associated with power as a resource of the datacenter.

The datacenter power devices and electrical attributes can be used to shape power in that the power devices can be used to control generation, reservation, consumption, allocation and distribution of datacenter power. For example, the power device data can be used to change the datacenter from a lagging power factor to a leading power factor. Reactive power can be preserved and used as real power when needed. In particular, the scale of power usage and power devices at massive datacenters can significantly affect power management when performed based on the plurality of power devices in the datacenter, allowing the fractional changes in individual power devices to in the aggregate translate to significant results in shaping power. Shaping power, advantageously, yields lower charges from the utility companies. The power management systems can operate metaphorically as a shock absorber for a corresponding power grid.

By way of background, a power grid can experience micro-deficits in power (e.g., in the middle of the day there is more solar than in middle of night) and the fluctuation in supply and demand of power provided by a power utility provider impacts the power grid efficiency and functionality. The power management system can mitigate the impact of micro-deficits on the grid and help counter the inefficiencies of a power grid. In one example, the capacity of the datacenter to generate power and store power can be leveraged to compensate for any power drawn away from the datacenter. A minimum threshold limit of the power for the datacenter can also be calculated based on units defined in the API. The minimum threshold limit indicates an amount of power needed to operate the datacenter. The minimum threshold limit of power can be based on a plurality of different internal and external factors. For example, an assessment of the performance of the datacenter based on workloads, operating environment, operations resources and physical resources can be used as a benchmark for setting minimum threshold limits for physical resources at the datacenter. A minimum threshold manager can be a portion of the resource management system that provides the threshold limits to be applied to resource management. It is contemplated that the APIs provide support for representing the minimum threshold data for performing evaluations with other representations in the resource management system. As, such, advantageously, the datacenter operates to allow for other renewable sources of energy to be part of the power grid in that the power management systems compensates for the micro-deficits that are common when using renewable sources of power. Further, the datacenter operates as a peaking plant with less environment impact than traditional peaking plants that emit greenhouse gases.

In operation, power device data can be received at a power manager and represented as a device instance. For example, the UPS can be represented as a device instance having a plurality of attributes—classification, generation capacity units of power, and reserved units of power. The device instance along with the minimum threshold reserve of power associated with operating the datacenter can be used to determine allocable units of power. The power manager can also specifically instruct power devices as to an amount of units of power to be generated and an amount of units of power to be reserved. Generating power can be based on the power device (e.g., generator) producing power in part by transmitting power from a generation source to be made available for consumption via the datacenter or the power device (e.g., fans, computing devices, power supplies) throttling usage of power such that an unused portion of power is made available for consumption via the datacenter. An amount of allocated units of power, defined based on the amount of power that is being generated and the amount of units of power that is reserved can be provided for a request and communicated to a power requesting interface.

Datacenter Operations Optimization System

By way of example, for illustration of a third embodiment described herein, a datacenter optimization system is provided for a byproduct management system for a datacenter that operates in combination with a co-located operating infrastructure. A co-located infrastructure can refer to one of the following: a power grid, an agricultural facility, a manufacturing facility, a building, and a remote datacenter. As discussed above, the datacenter includes several types of devices (byproduct devices) that operate to consume or supply a specific byproduct—i.e., a physical resource (e.g., power, water, carbon dioxide—$CO_2$, heat) of the datacenter. The co-located operating infrastructure can similarly be represented using the byproduct management system. Using the APIs and byproduct management system, a byproduct device, in the datacenter or the co-located operating infrastructure can be identified and classified with one or more physical resources (e.g., power devices, water devices, $CO_2$ devices or heat devices). The APIs define units for quantifying the physical resource including a generation capacity of units of the physical resource by the byproduct device and reserve units of the physical resource associated with the byproduct device. A minimum threshold limit of the physical resource can also be calculated based on units defined in the API. The minimum threshold limit indicates an amount of the physical resource needed to operate both the datacenter and the co-located operating infrastructure. The minimum threshold limit of power can be based on a plurality of different internal and external factors of the datacenter and the co-located operating infrastructure. For example, an assessment of the performance of the datacenter and the co-located infrastructure based on workloads, operating environment, operations resources and physical resources can be used as a benchmark for setting minimum threshold limits for physical resources at the datacenter and the co-located infrastructure. A minimum threshold manager can be a portion of the datacenter operations optimization system that provides the threshold limits to be applied to resource management. In this regard, the datacenter generation capacity, reserves, and minimum thresholds can be based on the combination of the datacenter and the co-located operating infrastructure.

In operation, a byproduct resource manager can receive data for a byproduct device associated with the datacenter. The byproduct resource manager can then use the data to generate a representation (e.g., instance) of the byproduct device. In particular, a generation capacity of units of the physical resource and reserve units of the physical resource are identified. The device instance can be used to determine allocable units of the physical resource. An amount of allocated units can be identified from the allocable units and communicated as available for use.

In one embodiment, the remote resource interface is associated with a second datacenter. The datacenter operations optimization system can provide a compute resource manager that has access to the availability of compute resources at the first datacenter. In particular, the availability of compute resource can be due to availability of physical resources. For example, a generator at the first datacenter may be undergoing maintenance process that requires the generator to run for a period of time. The compute resource manager of the datacenter operations optimizing system can identify the maintenance process as a resource management opportunity because of the additional compute capacity available at the datacenter, at least for a period when the generator is undergoing the maintenance run. As such, a computer workload, based on a request for compute resources from the second datacenter, can be received and processed at the first datacenter on behalf of the second data center.

Further, the byproduct resource manager and a remote resource interface that receives the allocated units of the physical resource (or compute resources that are based on the availability of a physical resource), can also communicate corresponding notifications. The notifications can be communicated to start running one or more physical devices within the datacenter and another operating infrastructure that is associated with the remote resource interface. The notifications initiate operation processes for processing the amount of allocated units of the one or more physical resources. For example, the datacenter may turn on a grid connector to support power variability of the grid, while the power grid starts operating power components within the grid that will use the allocated units.

Infrastructure Management System

By way of example, for illustration of a fourth embodiment described herein, an infrastructure management system is provided. The infrastructure management system operates with the APIs defined above and also the framework of defining a minimum threshold of a physical resource needed to operate the infrastructure. In this regard, the infrastructure management system receives infrastructure device data and generates device instances for the devices to support resource management functionality. In addition, the infrastructure management system, in particular, defines a representation (e.g., an operation instance) of an anticipated operation of a device in the infrastructure. The operation instance includes requested physical resource units that indicate an amount of a physical resource that is needed in anticipation of an infrastructure device operation. For example, the infrastructure device is an electrical appliance (e.g., manufacturing machinery, refrigerator, etc.) that is associated with the infrastructure (e.g., manufacturing plant, building facility etc.) and one or more additional infrastructure devices in the infrastructure are computing devices within the infrastructure. The anticipated need of the electrical appliance and a minimum threshold reserve of power that is associated with operating the one or more additional infrastructure devices are used to determine an amount of units of power to be generated and an amount of units power to be reserved.

The device instances can be used to determine allocable units of the physical resource. An identified amount of allocable units and a determination of allocated units of the physical resource can be based on an amount of units of the physical resource that is being generated and an amount of units of the physical resource that is reserved. Operating instructions including the amount of allocated units of the physical resource for the operational instance are then communicated to the infrastructure device. For example, the amount of allocated units of the physical resource is communicated to the electrical appliance and instructions to begin the anticipated electrical appliance operation.

The resource management system, implemented as byproduct management interfaces, datacenter power management, datacenter operations optimization and infrastructure resource management provides a system for datacenter providers to operate datacenters with optimum efficiency, where efficient use of resources in a datacenter leads to achieving maximum productivity with minimum wasted resources. Also the resource management system provides that capacity to utilize byproduct physical resources and incidental and unintended byproduct physical resources of operating datacenter as resources in and around the datacenter.

Resource Management System

With reference to FIG. 1, embodiments of the present disclosure can be discussed with reference to an exemplary resource management system 100 that is an operating environment for implementing functionality described herein. The resource management system 100 includes a byproduct resource manager 110, a plurality of devices 120 (120A, 120B, 120C and 120D) and a remote resource interface 130. The byproduct resource manager 110 monitors a plurality of byproducts 112 (112A, 112B, 112C and 112D) of the plurality of devices 120. The byproduct resource manager 110 also includes an Application Programming Interface 114 and a byproduct threshold manager 116.

With continued reference to FIG. 1, the resource management system 100 facilitates defining and allocating resources associated with the datacenter. The resource management system 100 includes the byproduct resource manager 110 that processes physical resources and requests for physical resources. The byproduct resource manager 110 operates based on a resource management framework and the components associated with the byproduct resource manager.

The resource management system includes the plurality of byproduct devices 102. A byproduct device can operate to perform operations in the datacenter 120A to support functionality of the datacenter. The byproduct devices 102 can also be associated with physical resources, referred to as byproduct device physical resources. As used herein, the byproduct can be associated with physical resources that are intentionally or incidentally generated. For example, byproduct device 102A is associated with physical resources 126A, 126B and 126C, byproduct device 102B is associated with physical resources 126A and 126B, and byproduct device 102C is associated with physical resources 126A and 126B and byproduct device 102D is associated with physical resource 120A, 126B, 126C and 126D. The byproduct devices operate to consume or supply the associated physical resources. Byproduct devices 102 can also operate to conserve physical resources. Byproduct devices 102 can communicate byproduct device data (e.g., byproduct device data 122) to support functionality described herein. The byproduct device data 122 can be generated based on sensors or other data tracking mechanisms associated with byproduct devices 102. The data that is measured and communicated at byproduct device 102 can be constructed and communicated based on APIs of the resource management system 100.

The resource management system 100 includes the remote resource interface 130. The remote resource interface 130 can be associated with a remote resource operating environment 130A (e.g., a power grid, a greenhouse, or a manufacturing plant). The remote resource operating environment 130A is associated with the remote resource interface to request (e.g., requested units 32) units of a physical resource available at the datacenter. The remote resource interface can be configured to access resource requirements of the remote resource operating environment 130A and communicate requested units of a physical resource. The requested units 132 can be constructed and communicated based on APIs of the resource management system 100. Requested units of a physical resource can be received and then used to generate an operation instance. However, it is further contemplated that the requested unit may be constructed as operation instances at the remote resource interfaces, in the alternative. The remote resource interface 130 receives allocated units 134 of the physical resource that is requested. The remote resource interface can communicate notifications that further trigger components within the remote resource operating environment 130 to utilize the allocated units of the physical resource.

The byproduct resource manager 110 includes the API 114 that supports a protocol for performing operations based on byproduct resources. The API allows the datacenter including datacenter devices and physical resources to be expressed in terms of operations, inputs, outputs, and underlying classification types for characteristics of the datacenter. The API can define functionalities that are independent of specific implementations, allowing definitions and implementations to vary without compromising interfaces. The API can support representing, processing and communicating information associated with the physical resources.

The byproduct resource manager 110 also includes the byproduct threshold manager 116. The byproduct threshold manager 116 support the resource management system 100 to operate based on minimum threshold limits of physical resources. The minimum threshold limit of a physical resource can refer to a benchmark attribute for guidance on how much of the physical resource is needed to operate the datacenter. A breach of the minimum threshold can be configured to trigger remediation operations. For example, alarms can be triggered or the datacenter can selectively shut operation of non-essential devices to conserve the physical resources. Other variations and combination of remediation operations are contemplated with embodiments described herein. The minimum threshold limit can be defined based on datacenter processes and performance metrics for the individual and combinations of physical resources. For example, an assessment of the performance of the datacenter based on workloads, operating environment, operations resources and physical resources can be used as a benchmark for setting minimum threshold limits for physical resources at the datacenter. The byproduct threshold manager 116 provides the threshold limits to be applied to resource management. It is contemplated that the APIs provide support for representing the minimum threshold data for performing evaluations with other representations in the resource management system.

The byproduct resource manager 110 uses the resource management framework including the API 114 and the byproduct threshold manager 116 to quantify resources of the datacenter. The resources are physical resources that are associated with the datacenter. The byproduct resource manager 110 can quantify resources in two situations—for devices and for requests. Quantifying resources can include generating an instance. A device instance (e.g., device instance 140) can refer to a computed representation of a datacenter device in relation to a physical resource and a reserve resource of the resource. An operation instance (e.g., operation instance 150) can refer to an amount of a physical resource needed to perform an anticipated operation. Some implementations of resource management system 100 can operate optionally based on requested units from a remote resource interface that communicates the requested units for a physical resource. As discussed in more detail with reference to infrastructure management system in FIG. 8, the byproduct resource manager can receive device data comprising requested units of a physical resource that is needed for an anticipated operation and then generate an operation instance to perform resource management. As such, requests for physical resources can be received and processing in different way by different components of the resource management system. The device instance and the operation instances can be used to determine allocable units of a resource. The byproduct resource manager can generate an instance for a device or operation.

The byproduct resource manager 110 controls an amount of the physical resource that is generated and an amount the physical resource that is reserved for a device from the plurality of devices. The byproduct resource manager 120 controls the device based on the device instance. For example, for a device 102A, device 102A can produce power. The device 102A can have a device instance that indicates physical resources associated with the devices. The byproduct resource manager 110 can communicate operation instructions 124 to the plurality of byproduct devices 120 to control generating and reserving physical resources associated with the byproduct devices. The byproduct resource manager 110 in particular controls the amount of a physical resource that is generated and the amount of physical resource that is reserved based on a minimum threshold resource. It is contemplated that byproduct resource manager may communicate control such that any value or no value for an amount of a physical resource to be generated and amount of physical resource to be reserved. Controls can be communicated dynamically based on changes in the infrastructure. The minimum threshold units of physical resources can be accessed via the byproduct threshold manager 116. The minimum threshold reserve in combination with the control over generating and reserving the physical resources help identify an allocable amount (e.g., allocable units 160) of the physical resource. An allocated amount (e.g., allocated units) of the allocable amount can be communicated to the remote resource interface 130. In operation, the resource management system can support different types of implementations including—a datacenter byproduct management interface system, a datacenter power management system, a datacenter operations optimization system, and an infrastructure resource management system.

Datacenter Byproduct Management System

With continued reference to FIG. 1, the datacenter 120A can support a datacenter byproduct management system. In operation, the byproduct resource manager 110 is configured to receive byproduct device data 112 for byproduct devices associated with the data 120. The byproduct resource manager also generates, based on the byproduct device data, a device instance (e.g., device instance 140) having a plurality of attributes associated with the byproduct device. The device instance includes a generation capacity of units of a physical resource and reserve units of the physical resource. The device instance is a computed representation of the byproduct device in relation to the physical resource and a reserve of the physical resource, the device instance supports determining allocable units (e.g., allocable units 160) of the physical resource.

The byproduct resource manager 110 communicates operation instructions to the byproduct device for an amount of units of the physical resource to be generated and an amount of units of the physical resource to be reserved, based on the device instance and a minimum threshold reserve of the physical resource associated with operating the datacenter. The byproduct resource manager 110 automatically updates an amount of allocable units of the physical resource based on an amount of units of the physical resource that is being generated and an amount of units of the physical resource that is reserved.

The physical resource to be generated is generated based on the byproduct device producing the physical resource. As used herein, producing the physical resource can refer to transmitting the physical resource from a generation source to be made available for consumption via the datacenter. Producing the physical resource can also be based on the byproduct device throttling usage of the physical resource such that an unused portion of the physical resource is made available for consumption via the datacenter. Reserving the physical resource can be based on an internal component (e.g., UPS battery) or an external component (e.g., independent batter cells) associated with the byproduct device.

The remote resource interface 130 configured can generate a request having requested units of the physical resource. The byproduct resource manager can receive the request and generate an operation instance for processing the request. The remote resource interface can then receive an amount of allocated units for the request based on an amount of units of the physical resource that is being generated and an amount of units of the physical resource that is reserved.

It is contemplated that the byproduct resource manager and the remote resource interface can communicate corresponding notifications to actuate one or more physical devices within the datacenter and an operating infrastructure providing an operating environment for remote resource interface. The notification initiates operation processes for processing the amount of allocated units of the physical resource.

Figure 2:
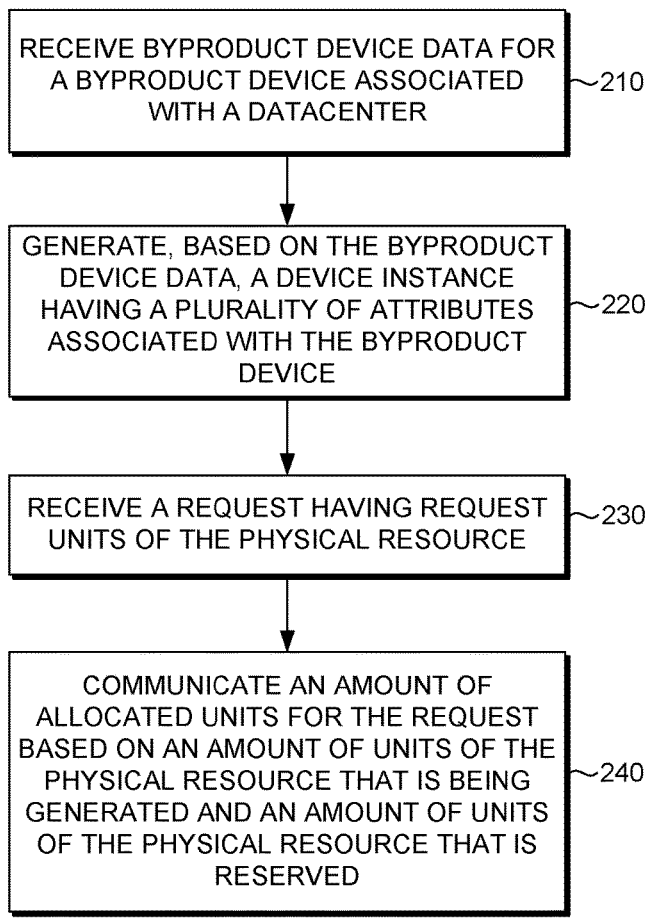
FIG. 2 is a flow diagram showing an exemplary method for providing resource management, in accordance with embodiments described herein.

Turning now to FIG. 2, a flow diagram is provided that illustrates a method 200 for providing resource management. Initially at block 210, byproduct device data is received for a byproduct device associated with a datacenter. The byproduct device data can be received based on an APIs that are supported at the byproduct device data such that the data is provided in based on protocols of the API. At block 220, a device instance is generated based on the byproduct device data. The device instance includes a plurality of attributes associated with the byproduct device. The device instance includes a generation capacity of units of a physical resource and reserve units of the physical resource. The device instance is a computed representation of the byproduct device in relation to the physical resource and a reserve of the physical resource, the device instance supports determining allocable units of the physical resource.

At block 230, a request having requested units of the physical resource is received. The request can be received from a remote resource interface. The request can be received based on APIs that are supported at the remote resource interface such that the request is provided in based on protocols of the API. Upon receiving the request, the byproduct resource manager can communicate operation instructions to the byproduct device for an amount of units of the physical resource to be generated and an amount of units of the physical resource to be reserved, based at least in part on the device instance and the minimum threshold reserve of the physical resource associated with the datacenter. An operation instance can be generated, the operation instance comprising requested units that indicate an amount of a physical resource needed in anticipation of an operation. The physical resource being generated is generated based on the byproduct device throttling usage of the physical resource such that an unused portion of the physical resource is made available for consumption via the datacenter. Reserving the physical resource is based on an internal component or an external component associated with the byproduct device. At block 240, an amount of allocated units for the request based on an amount of units of the physical resource that is being generated and an amount of units of the physical resource that are reserved, is communicated. The amount of units of the physical resources being generated and the amount of units of the physical resource being reserved is based at least in part on the device instance and a minimum threshold reserve of the physical resource associated with operating the datacenter.

Figure 3:
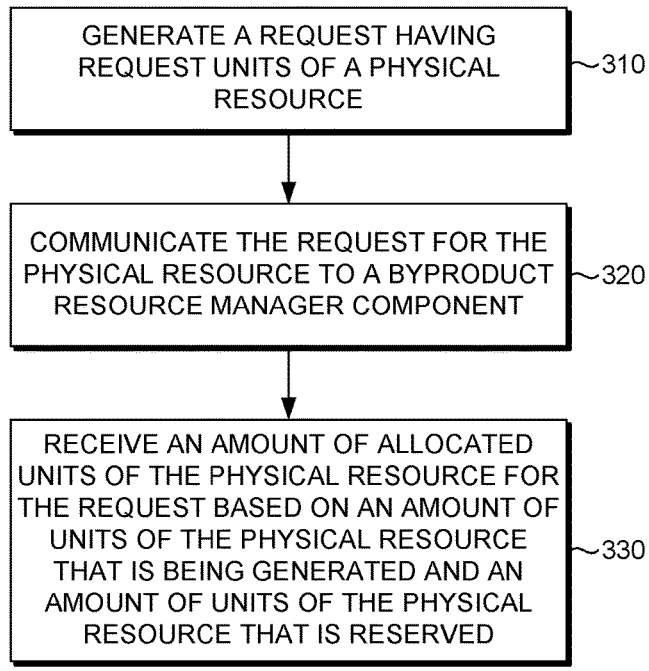
FIG. 3 is a flow diagram showing an exemplary method for providing resource management, in accordance with embodiments described herein.

Turning now to FIG. 3, a flow diagram is provided that illustrates a method 300 for providing resource management. Computer storage media having computer-executable instructions embodied thereon that, when executed, by one or more processors, causes the one or more processors to perform the method for datacenter byproduct management. Initially at block 310, a request having requested units of a physical resource is generated. The request is generated based on remote device data of a remote device that is associated with the physical resource. The physical resource is selected from one of the following: power, water, carbon dioxide and heat. At block 320, the request for the physical resource is communicated to a byproduct resource manager; the byproduct resource manager operates to generate device instances for byproduct devices. The device instances include a generation capacity of units of a physical resource and reserve units of the physical resource. A device instance is a computed representation of a byproduct device in relation to the physical resource and a reserve of the physical resource, the device instance supports determining allocable units of the physical resource.

At block 330, an amount of allocated units of the physical resource for the request based on an amount of units of the physical resource that is being generated and an amount of units of the physical resource that is reserved is received. The amount of units of the physical resources being generated and the amount of units of the physical resource being reserved is based at least in part on the device instance and the minimum threshold reserve of the physical resource associated with the datacenter. A notification to actuate one or more physical devices within an operating infrastructure that is the operating environment of the remote device is communicated to initiate operation processes for the processing the amount of allocated units of the physical resource. The operating infrastructure is selected from one of the following: a power grid, a co-located agricultural facility, a manufacturing facility, a building, and a remote datacenter. The byproduct resource manager upon receiving the request communicates operation instructions to the byproduct device for an amount of units of the physical resource to be generated and the amount of units of the physical resource to be reserved, based on the device instance and the minimum threshold reserve of the physical resource associated with operating the datacenter.

Datacenter Power Management System

Figure 4:
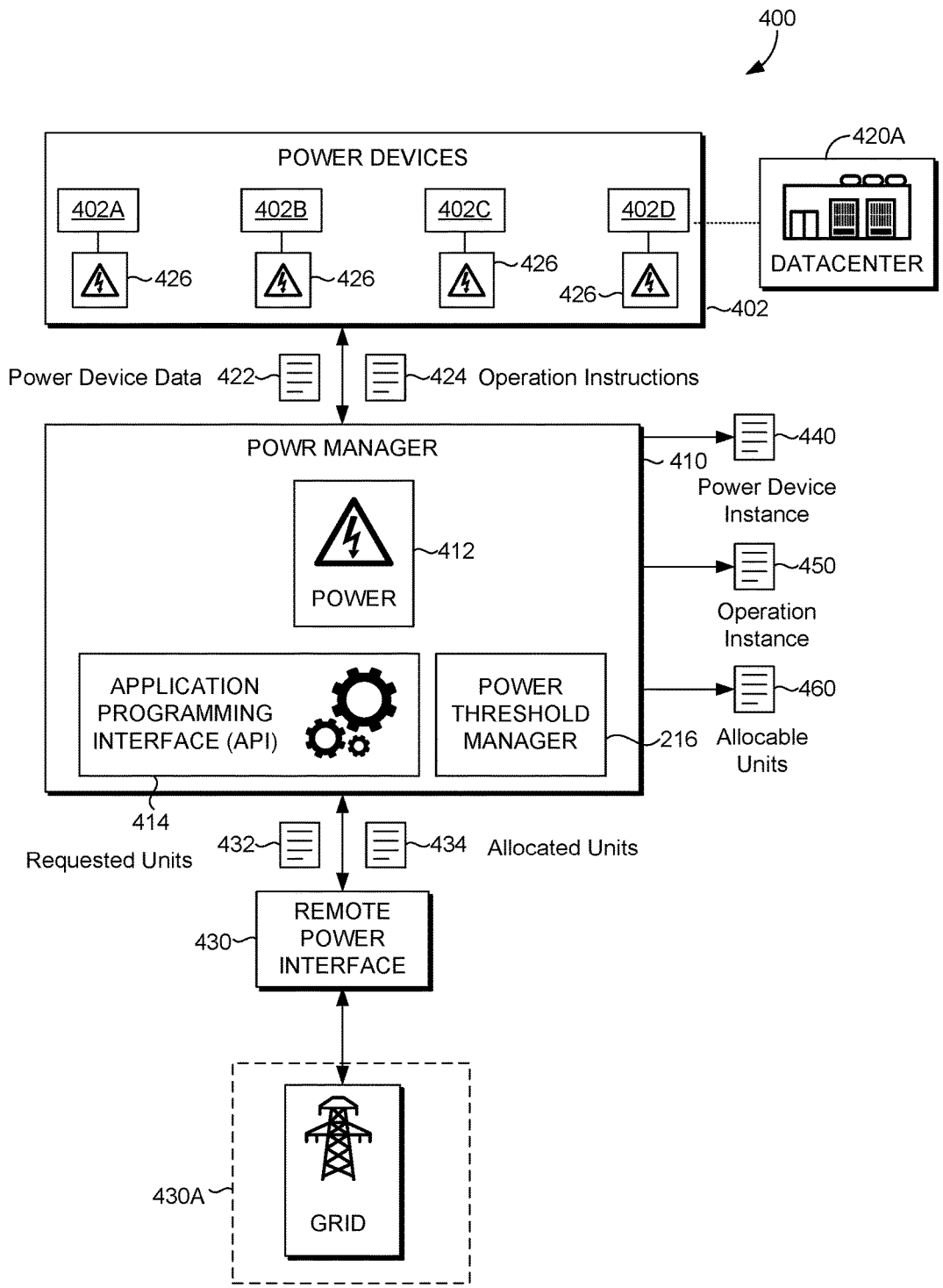
FIG. 4 is a block diagram of an exemplary distributed computing environment in which embodiments described herein may be employed.

With reference to FIG. 4, embodiments of the present disclosure can be discussed with reference to an exemplary implementation of the resource management system 100 as a datacenter power management system 400. The power management system 400 includes a power manager 410, a plurality of devices 402 (402A, 402B, 402C and 402D) and a remote resource interface 430. The byproduct resource manager 410 monitors power 412 of the plurality of devices 102 (e.g., power 426). The byproduct resource manager 410 also includes an Application Programming Interface 414 and a power threshold manager 216. The power management system is provided for leveraging power devices in a datacenter to support an electrical grid 430A via the remote power interface 430.

In operation, the power manager 410 receives power device data 422 for a power device 402 associated with the datacenter 420A. The use of datacenter 420A is not meant to be limiting. Other types of infrastructure supporting a plurality of power devices 402 that can be monitored as discussed herein are contemplated. The power manager 410 can generate based on the power device data 422, a device instance (e.g., power device instance 440) having a plurality of attributes associated with the power device 402, the device instance 440 comprising a generation capacity of units of power and reserve units of power. The device instance 440 is a computed representation of the power device 402 in relation to power 426 as a physical resource and a reserve of power, the instance 440 supports determining allocable units of power. The power manager 410 communicates operation instructions (e.g., operation instructions 424) to the power device 402 for an amount of units of power to be generated and an amount of units of power to be reserved, based on the device instance 440 and a minimum threshold reserve of power associated with operating the datacenter 420A.

The power manager 410 automatically updates an amount of allocable units of power based on an amount of units of power that is being generated and an amount of units of power that is reserved. The power to be generated is generated based on the power device producing power in part by transmitting power from a generation source to be made available for consumption via the datacenter or the power device throttling usage of power such that an unused portion of power is made available for consumption via the datacenter. The power to be reserved is reserved based an internal component or an external component associated with the power device.

The remote power interface 430 can generate a request (e.g., requested units 432) having requested units of power. The remote power interface can communicate the requested units 432 to receive allocated units (e.g., allocated units 434) of power from the power manager 410. The power manager can receive the request and generate an operation instance (e.g., operation instance 450) for processing the request. The remote power interface receives an amount of allocated units for the request based on an amount of units of power that is being generated and an amount of units of power that is reserved. In particular, the amount of units of power that is being generated and an amount of units of power that is reserved in combination with the device instance 440 help identify an allocable amount (e.g., allocable units 460). A power management scheme supports generating and reserving power based on corresponding electrical components and electricity processing techniques associated with the power device. The power manager 410 and the remote power interface 430 can communicate corresponding notifications to actuate one or more physical devices within the datacenter and a power grid, respectively. The notifications initiate operation processes for the processing the amount of allocated units of power.

Figure 5:
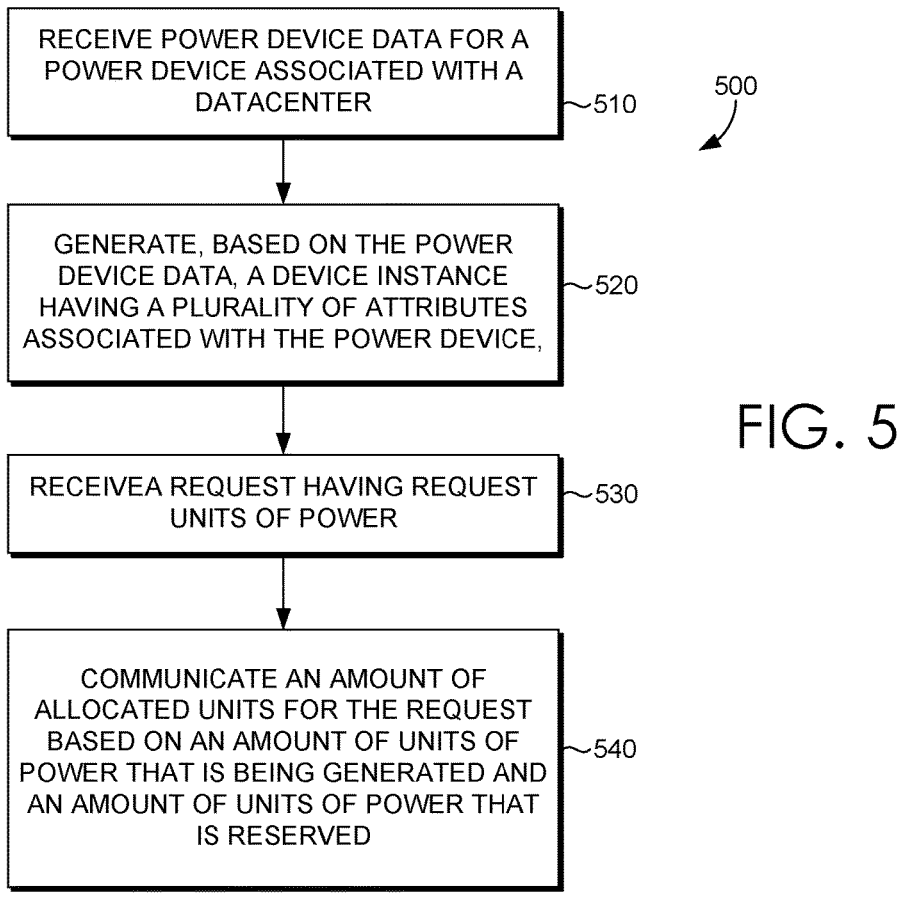
FIG. 5 is a flow diagram showing an exemplary method for providing resource management, in accordance with embodiments described herein.

Turning now to FIG. 5, a flow diagram is provided that illustrates a method 500 for providing resource management. Initially at block 510, power device data for a power device associated with a datacenter is received. The power device data can be received based on an APIs that are supported at the byproduct device data such that the data is provided in based on protocols of the API. At block 520, a device instance having a plurality of attributes associated with the power device is generated based on the power device data. The device instance includes a generation capacity of units of power and reserve units of power. The device instance is a computed representation of the power device in relation to power as a physical resource and a reserve of power, the device instance supports determining allocable units of power.

At block 530, a request having requested units of power is received. The request can be received from a remote power interface. Upon receiving the request, the power manager can communicate operation instructions to the power device for an amount of units of power to be generated and an amount of units of power to be reserved, based at least in part on the device instance and the minimum threshold reserve of the power associated with the datacenter. The power being generated is generated based on the power device throttling usage of the power such that an unused portion of the power is made available for consumption via the datacenter. Reserving the power is based on an internal component or an external component associated with the byproduct device.

At block 540, an amount of allocated units for the request based on an amount of units of the power that is being generated and an amount of units of the power that is reserved is communicated. The amount of units of the power being generated and the amount of units of the power being reserved is based at least in part on the device instance and a minimum threshold reserve of the power associated with operating the datacenter. The power generated is based on an Application Programming Interface that supports a protocol for processing powers based on the power device in relation to power and a reserve of power.

Figure 6:
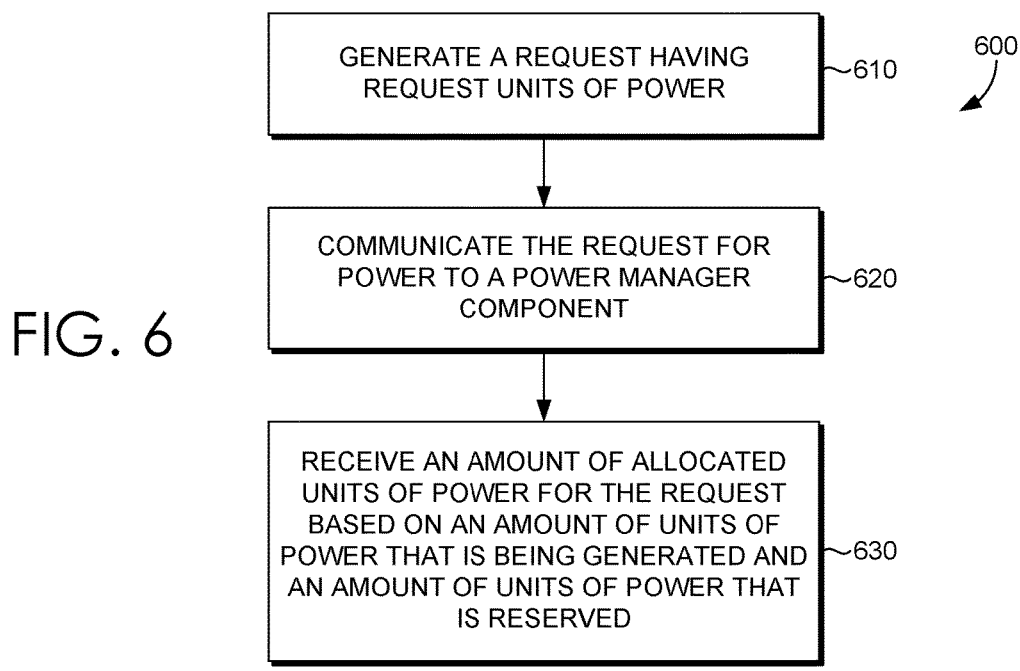
FIG. 6 is a flow diagram showing an exemplary method for providing resource management, in accordance with embodiments described herein.

Turning now to FIG. 6, a flow diagram is provided that illustrates a method 600 for providing resource management. Computer storage media having computer-executable instructions embodied thereon that, when executed, by one or more processors, causes the one or more processors to perform the method for datacenter power management. Initially at block 610, a request having requested units of a power is generated. The request is generated based on remote power device data of a remote power device that is associated with the power. At block 620, the request for the power is communicated to a power manager; the power manager operates to generate power device instances for power devices. The device instances include a generation capacity of units of a power and reserve units of power. A device instance is a computed representation of a power device in relation to power and a reserve of the power, the device instance supports determining allocable units of the power.

At block 630, an amount of allocated units of the power for the request based on an amount of units of the power that is being generated and an amount of units of the power that is reserved is received. The amount of units of the power being generated and the amount of units of the power being reserved is based at least in part on the device instance and the minimum threshold reserve of the power associated with the datacenter. A notification to actuate one or more physical devices within an operating infrastructure that is the operating environment of the remote device is communicated to initiate operation processes for the processing the amount of allocated units of the power. The power grid is a smart grid that operates based on a grid connect system to opportunistically balance the power grid based on the datacenter power usage.

Datacenter Operations Optimization System

Figure 7:
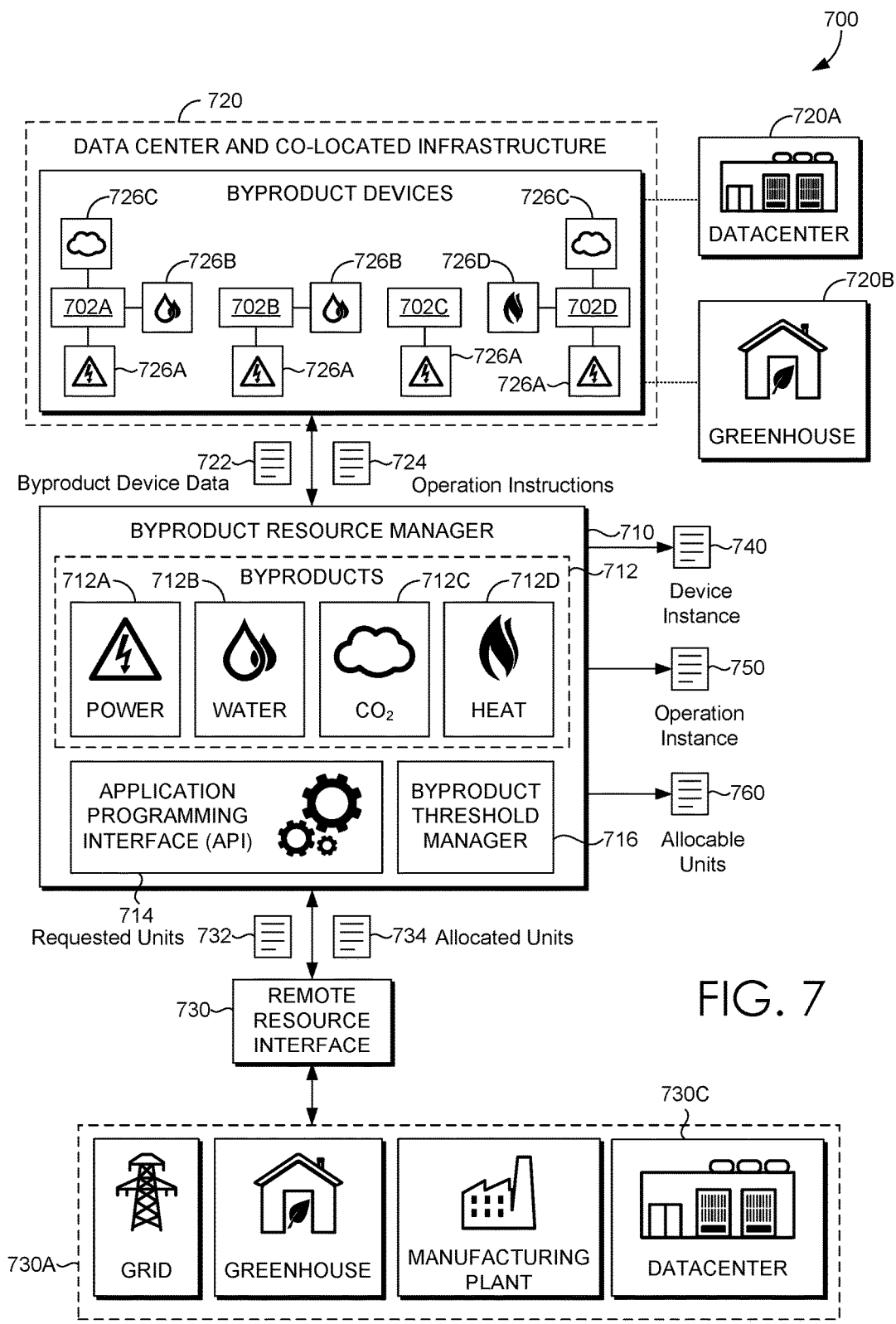
FIG. 7 is a block diagram of an exemplary distributed computing environment in which embodiments described herein may be employed.

With reference to FIG. 7, embodiments of the present disclosure can be discussed with reference to an exemplary implementation of the resource management system 100 as a datacenter operations optimization system management system 700. The datacenter operations optimization system 700 includes a byproduct resource manager 710, a plurality of devices 702 (702A, 702B, 702C and 702D) and a remote resource interface 730. The byproduct resource manager 710 monitors a plurality of byproducts 712 (712A, 712B, 712C and 712D) of the plurality of devices 702 (e.g., 726A, 726B, 726C and 726D). The byproduct resource manager 710 also includes an Application Programming Interface 714 and a byproduct threshold manager 716.

In operation, the byproduct resource manager 710 receives byproduct device data (e.g., byproduct device data 722) for a plurality of byproduct devices (e.g., plurality of byproduct devices 702) associated with a datacenter 720A associated with a co-located operating infrastructure (e.g., the greenhouse 720B) that is an operating environment that shares physical resources with the datacenter 720A. The datacenter 720A is shown with greenhouse 720B as an exemplary co-located operating infrastructure. The byproduct resource manager 710 is responsible for generating, based on the byproduct device data 722, a plurality of device instances (e.g., device instance 740) having a plurality of attributes associated with the byproduct devices 702. The plurality of device instances 740 includes a generation capacity of units of one or more physical resources and reserve units of the one or more physical resources. A device instance 740 is a computed representation of the byproduct devices 702 in relation to the one or more physical resources and a reserve of the one or more physical resources, and the device instance 740 supports determining allocable units of the one or more physical resources.

The byproduct resource manager communicates operation instructions (e.g., operation instructions 724) to the byproduct devices for an amount of units of the one or more physical resources to be generated and an amount of units of the one or more physical resources to be reserved, based on the plurality of device instances and a minimum threshold reserve of the one or more physical resources associated with operating the datacenter with the co-located operating infrastructure. The minimum threshold reserve can be retrieved from the byproduct threshold manager 716.

The byproduct resource manager 710 automatically updates an amount of allocable units of the one or more physical resources based on an amount of the one or more physical resources that are being generated and an amount of units of the one or more physical resources that are reserved. The one or more physical resources to be generated are generated based on the byproduct device 702 producing the one or more physical resources. A physical resource can be produced by transmitting the physical resource from a generation source to be made available for consumption via the datacenter 720A or the byproduct device 702 throttling usage of the one or more physical resources such that an unused portion of the one or more physical resource is made available for consumption via the datacenter 720A by one or more external consumer 730A such as remote datacenter 730C. Reserving the one or more physical resources is based on an internal component or an external component associated with the byproduct devices in the datacenter and co-located operating infrastructure.

The remote resource interface is responsible for generating a request having requested units of the one or more physical resources. The byproduct resource manager can receive the request and generate an operation instance (e.g., operation instance 750) for processing the request. The remote resource interface 730 can communicate the requested units 732 to receive allocated units (e.g., allocated units 734) of the one or more physical resources from the byproduct resource manager 710. The remote resource interface 730 receives an amount of allocated units for the request based on an amount of units of power that is being generated and an amount of units of power that is reserved. In particular, the amount of units of power that is being generated and an amount of units of the one or more physical resources that is reserved in combination with the device instance 740 help identify an allocable amount (e.g., allocable units 760). The byproduct resource manager 710 and the remote resource interface 730 can communicate corresponding notifications to actuate one or more physical devices within the datacenter and an operating environment for the remote resource interface, respectively. The notifications initiate operation processes for the processing the amount of allocated units of the one or more physical resources.

The remote datacenter manager of remote datacenter 730C is responsible for generating a request having requested units for compute resources. The remote datacenter manager can communicate the request to the byproduct resource manager 710 (e.g., compute resource manager—not shown) in order to receive an amount of allocated units of compute resources based on an amount of units of the one or more physical resources that are being generated and an amount of units of the one or more physical resources that are reserved. The remote datacenter manager can transmit a compute workload to the datacenter to utilize the amount of allocated units of compute resources that are based on the availability of physical resources at the datacenter.

Figure 8:
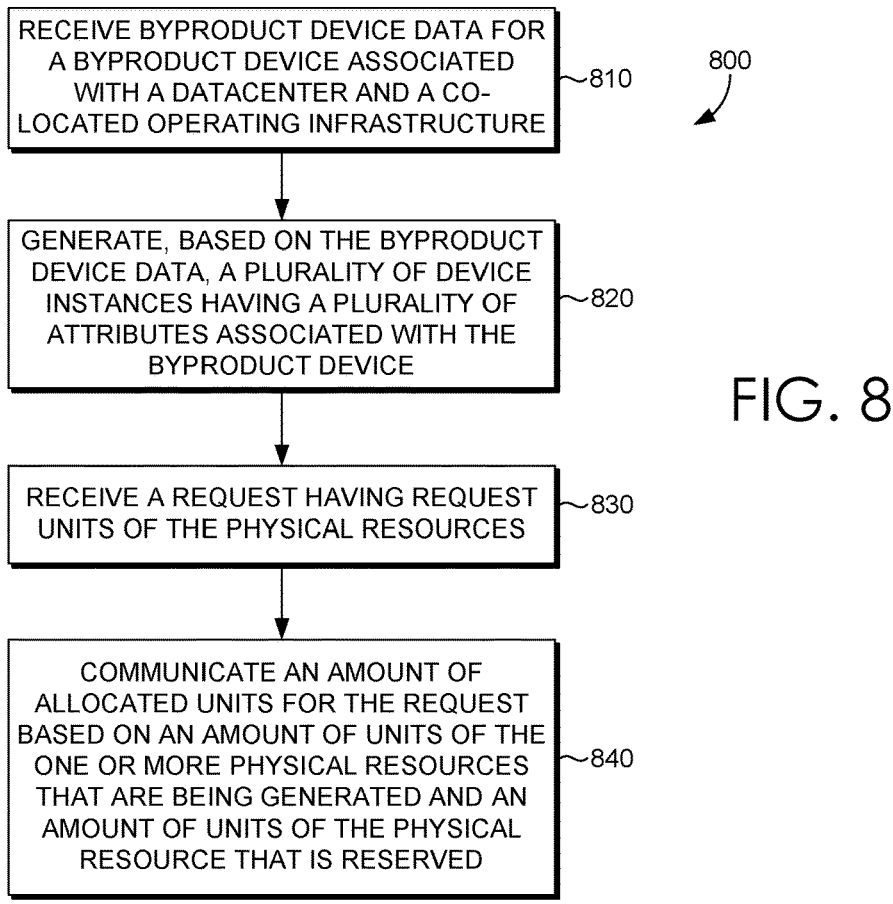
FIG. 8 is a flow diagram showing an exemplary method for providing resource management, in accordance with embodiments described herein.

Turning now to FIG. 8, a flow diagram is provided that illustrates a method 800 for providing resource management. Initially at block 810, byproduct device data is received for a byproduct device associated with a datacenter and a co-located operating infrastructure. The co-located operating infrastructure is an operating environment that shares physical resources with the datacenter. The byproduct device data can be received based on an APIs that are supported at the byproduct device data such that the data is provided in based on protocols of the API. At block 820, a device instance is generated based on the byproduct device data. The device instance includes a plurality of attributes associated with the byproduct device. The device instance includes a generation capacity of units of one or more physical resource and reserve units of the physical resource. The device instance is a computed representation of the byproduct device in relation to the one or more physical resource and a reserve of the one or more physical resource, the device instance supports determining allocable units of the physical resource.

At block 830, a request having requested units of the physical resource is received. The request can be received from a remote resource interface. The request can be received based on APIs that are supported at the remote resource interface such that the request is provided in based on protocols of the API. Upon receiving the request, the byproduct resource manager can communicate operation instructions to the byproduct device for an amount of units of the one or more physical resources to be generated and an amount of units of the physical resource to be reserved, based at least in part on the device instance and the minimum threshold reserve of the one or more physical resources associated with the datacenter. The one or more physical resource being generated is generated based on the byproduct device throttling usage of the physical resource such that an unused portion of the one or more physical resource is made available for consumption via the datacenter. Reserving the one or more physical resource is based on an internal component or an external component associated with the byproduct device.

At block 840, an amount of allocated units for the request based on an amount of units of the one or more physical resource that is being generated and an amount of units of the physical resource that are reserved, is communicated. The amount of units of the one or more physical resources being generated and the amount of units of the physical resource being reserved is based at least in part on the device instance and a minimum threshold reserve of the one or more physical resource associated with operating the datacenter. The byproduct resource manager automatically updates an amount of allocable units of the one or more physical resources based on an amount of the one or more physical resources that are being generated and an amount of units of the one or more physical resources that are reserved.

Figure 9:
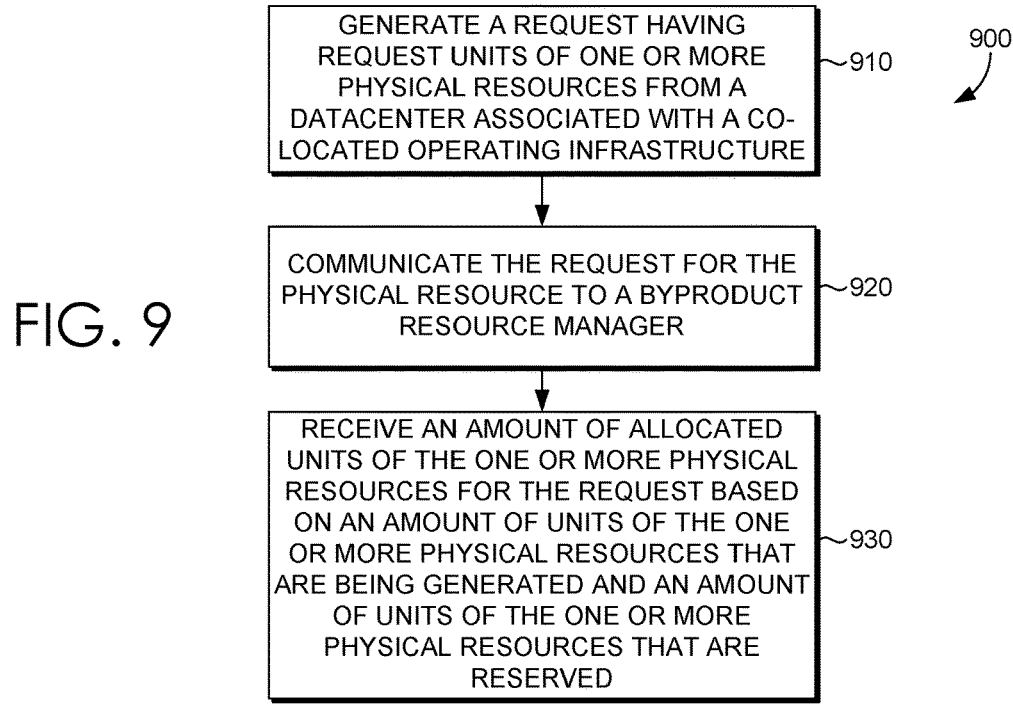
FIG. 9 is a flow diagram showing an exemplary method for providing resource management, in accordance with embodiments described herein.

Turning now to FIG. 9, a flow diagram is provided that illustrates a method 900 for providing resource management. Computer storage media having computer-executable instructions embodied thereon that, when executed, by one or more processors, causes the one or more processors to perform the method for datacenter byproduct management. Initially at block 910, a request having requested units of one or more physical resource is generated. The request is generated for one or more physical resource from a datacenter associated with a co-located operating infrastructure that is an operating environment that shares physical resource with the datacenter. The request is generated based on remote device data of a remote device that is associated with the one or more physical resources. The physical resource is selected from one of the following: power, water, carbon dioxide and heat. At block 920, the request for the one or more physical resource is communicated to a byproduct resource manager; the byproduct resource manager operates to generate a plurality of device instances for byproduct devices. The plurality of device instances includes a generation capacity of units of a physical resource and reserve units of the physical resource. A device instance is a computed representation of a byproduct device in relation to the physical resource and a reserve of the physical resource, the device instance supports determining allocable units of the physical resource.

At block 930, an amount of allocated units of the physical resource for the request based on an amount of units of the one or more physical resources that is being generated and an amount of units of the physical resource that is reserved is received. The amount of units of the physical resources being generated and the amount of units of the one or more physical resource being reserved is based at least in part on the device instance and the minimum threshold reserve of the one or more physical resources associated with the datacenter. A notification to actuate one or more physical devices within an operating infrastructure that is the operating environment of the remote device is communicated to initiate operation processes for the processing the amount of allocated units of the physical resource. The operating infrastructure is selected from one of the following: a power grid, a co-located agricultural facility, a manufacturing facility, a building, and a remote datacenter. The byproduct resource manager upon receiving the request communicates operation instructions to the byproduct device for an amount of units of the physical resource to be generated and the amount of units of the physical resource to be reserved, based on the device instance and the minimum threshold reserve of the physical resource associated with operating the datacenter.

Infrastructure Management System

Figure 10:
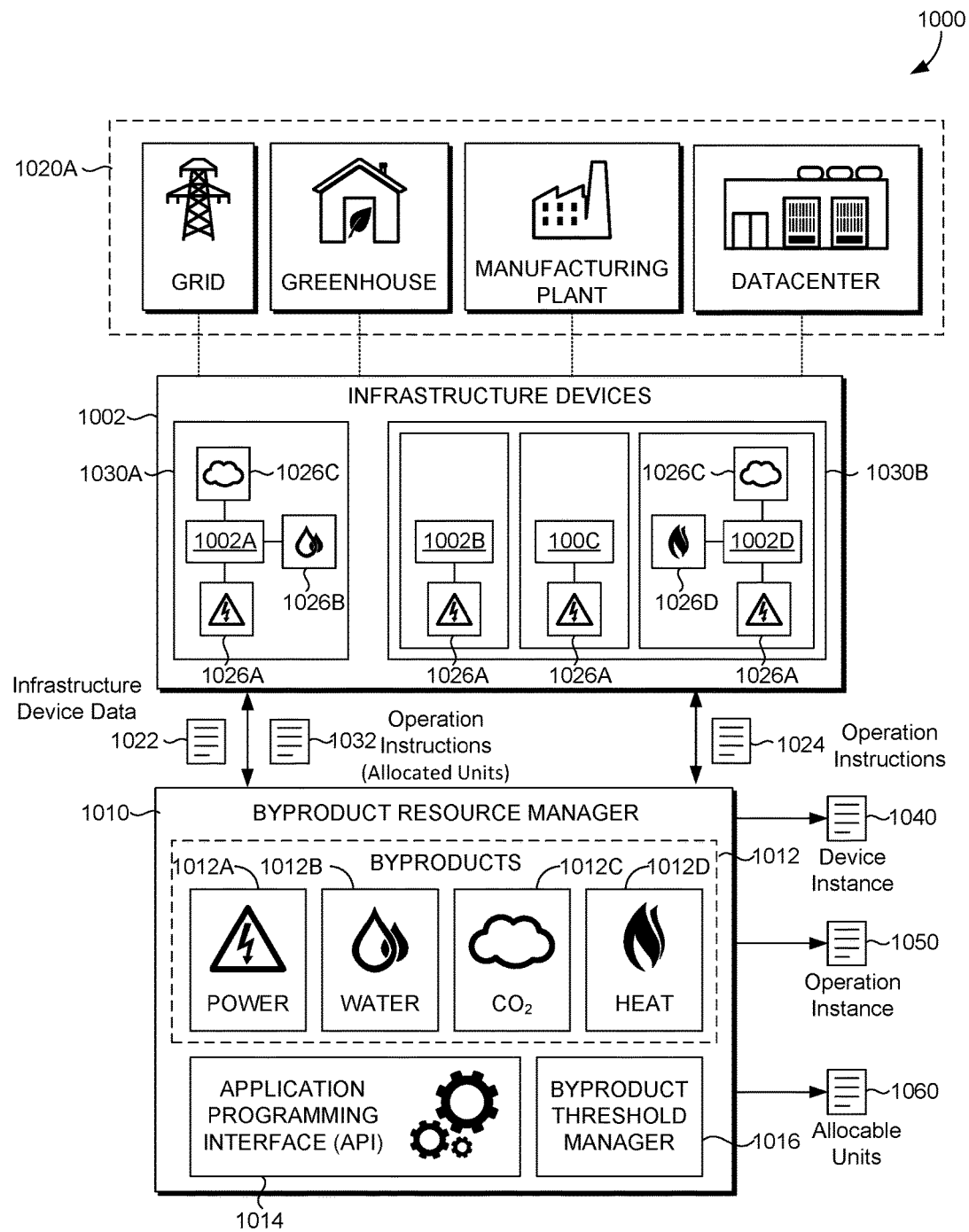
FIG. 10 is a block diagram of an exemplary distributed computing environment in which embodiments described herein may be employed.

With reference to FIG. 10, embodiments of the present disclosure can be discussed with reference to an exemplary implementation of the resource management system 100 as an infrastructure management system 1000. The infrastructure management system 1000 includes a byproduct resource manager 1010, a plurality of devices 1002 (1002A, 1002B, 1002C and 1002D). The infrastructure devices can further be divided into 1030A associated with a requesting infrastructure device and 1030B associated with additional infrastructure devices. The byproduct resource manager 1010 monitors byproduct resources (e.g., 1012A, 1012B, 1012C and 1012D) of the plurality of devices 1002 (e.g., 1026A, 1026B, 1026C and 1026D). The byproduct resource manager 1010 also includes an Application Programming Interface 1014 and a power threshold manager 1016.

In operation, the byproduct resource manager 1010 (or infrastructure resource manager) receives infrastructure device data (e.g., infrastructure device data 1022) for an infrastructure device (e.g., infrastructure device 1030) associated with a physical resource of an infrastructure. The infrastructure (e.g., infrastructure 1020A) can be selected form one of the following: a power grid, a co-located agricultural facility, a manufacturing facility, a building, and a remote datacenter. An operation instance (e.g., operation instance 1050) is generated based on the infrastructure device data. The operation instance includes a plurality of attributes associated with the infrastructure device. The operation instance also includes requested units that indicate an amount of a physical resource is needed to perform an infrastructure device operation. The byproduct resource manager 1010 communicates operation instructions (e.g., operation instructions 1024) to one or more additional infrastructure devices (e.g., additional infrastructure devices 1030B) for an amount of units of the physical resource to be generated and an amount of units of the physical resource to be reserved. The operating instructions are based on the operation instance and a minimum threshold reserve of the physical resource associated with operating the infrastructure. The byproduct resource manager 1010 determines an amount of allocable units (e.g., allocable units 1060) and an amount of allocated units of the physical resource based in part on the operation instance and an amount of units of the physical resource that is being generated and the amount of units of the physical resource that is reserved and then communicates operation instructions (e.g., operation instructions 1032) to the infrastructure device. The operation instructions include the amount of allocated units of the physical resource. The byproduct resource manager may be responsible to generate, based on the infrastructure device data, a device instance (e.g., device instance 1040) having a plurality of attributes associated with the infrastructure device, the device instance comprising a generation capacity of units of a physical resource and reserve units of the physical resource, wherein the device instance is a computed representation of the byproduct device in relation to the physical resource and a reserve of the physical resource, the device instance supports determining allocable units of the physical resource.

The infrastructure resource manager automatically updates an amount of allocable units of the physical resource based on the amount of units of the physical resource that is being generated and an amount of units of the physical resource that is reserved. The physical resource to be generated is generated based on the one or more additional infrastructure devices producing the physical resource in part by transmitting the physical resource from a generation source to be made available for consumption via the datacenter or the one or more additional infrastructure devices throttling usage of the physical resource such that an unused portion of the physical resource is made available for consumption via the datacenter.

An infrastructure device is configured to communicate the infrastructure device data that is used in determining the amount of the requested physical resource units need for the anticipated infrastructure device operation, receive the amount of allocated units for the infrastructure device operation; and initiate processing of the amount of allocated units for the performing the infrastructure device operation. By way of example, the infrastructure device is an electrical appliance that is associated with the infrastructure operating as a building facility and the one or more additional infrastructures device are computing devices within the building. In another example, the infrastructure device is an electrical grid device that is associated with the infrastructure operating based on an electric grid, a grid connector, and a datacenter, and the one or more additional infrastructure devices are power devices in the datacenter.

As discussed with reference to datacenter optimization operations system, the infrastructure management system can further include support a remote datacenter manager that is responsible for generating a request having requested units for compute resources. The remote datacenter manager can communicate the request to the byproduct resource manager 1010 (e.g., compute resource manager—not shown) in order to receive an amount of allocated units of compute resources based on an amount of units of the one or more physical resources that are being generated and an amount of units of the one or more physical resources that are reserved. The remote datacenter manager can transmit a compute workload to the datacenter to utilize the amount of allocated units of compute resources that are based on the availability of physical resources at the datacenter.

Figure 11:
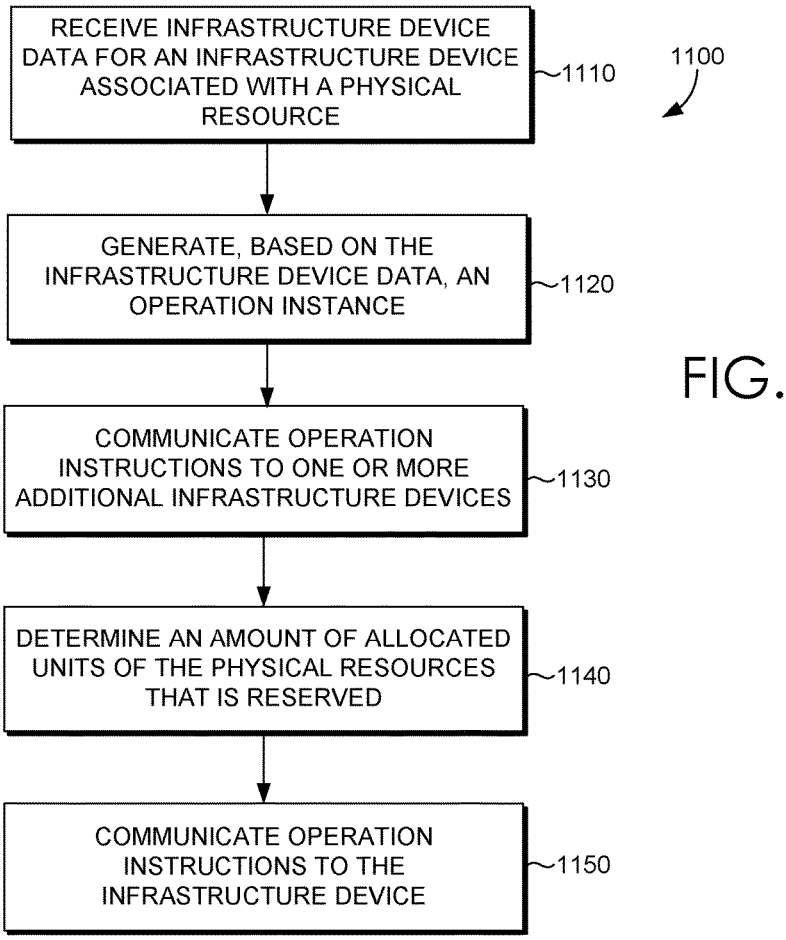
FIG. 11 is a flow diagram showing an exemplary method for providing resource management, in accordance with embodiments described herein.

Turning now to FIG. 11, a flow diagram is provided that illustrates a method 1100 for providing resource management. Initially at block 1110, infrastructure data for an infrastructure device associated with a physical resource is received. At block 1120, an operation instance having a plurality of attributes associated with the infrastructure device is generated. The operation instance includes requested units that indicate an amount of a physical resource needed in anticipation of an infrastructure device operation. At block 1130, operation instructions are communicated to one or more additional infrastructure devices an amount of units of the physical resource to be generated and an amount of units of the physical resource to be reserved, based on the operation instance and a minimum threshold reserve of the physical resource associated with operating the one or more additional infrastructure devices.

At block 1140, an amount of allocated units of the physical resources is determined based in part on the instance and an amount of units of the physical resource that is being generated and the amount of units of the physical resource that is reserved. The physical resource being generated is generated based on the byproduct device producing the physical resource in part by transmitting the physical resource from a generation source to be made available for consumption via the datacenter. In the alternative, the physical resource being generated is generated based on the byproduct device throttling usage of the physical resource such that an unused portion of the physical resource is made available for consumption via the datacenter. At block 1150, operation instructions to the infrastructure device are communicated. The operation instructions include the amount of allocated units of the physical resource. A notification to actuate one or more physical devices within the infrastructure is communicated to initiate operation processes for processing the amount of allocated units of the physical resource.

Figure 12:
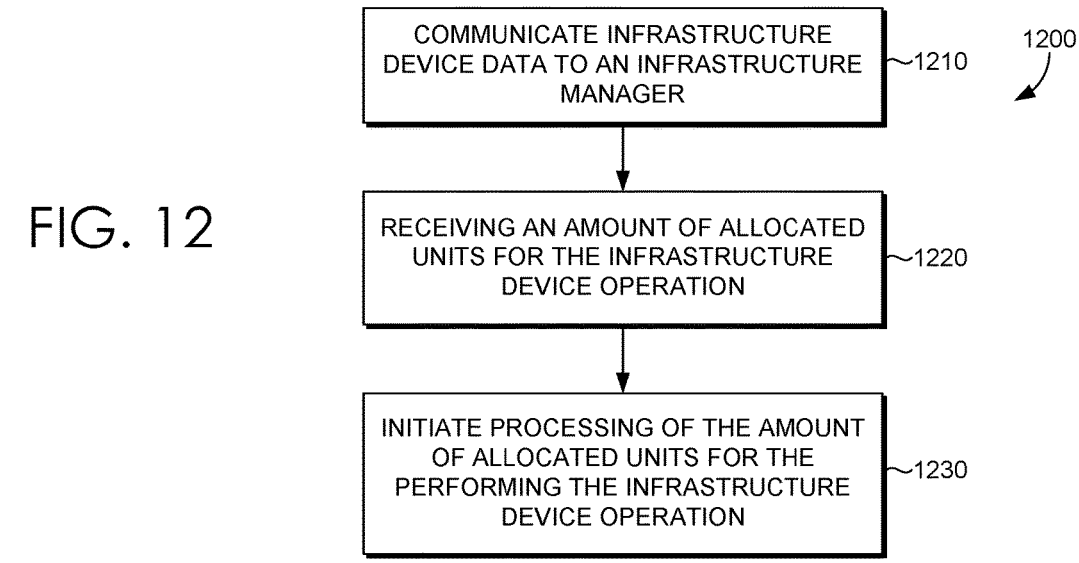
FIG. 12 is a flow diagram showing an exemplary method for providing resource management, in accordance with embodiments described herein.

Turning now to FIG. 12 a flow diagram is provided that illustrates a method 1200 for resource management. Computer storage media having computer-executable instructions embodied thereon that, when executed, by one or more processors, causes the one or more processors to perform the method for datacenter power management. Initially at block 1210, infrastructure device data is communicated to an infrastructure resource manager. The infrastructure resource manager generates operation instances having a plurality of attributes associated with the infrastructure device, the operation instance comprising requested physical resource units that indicate an amount of a physical resource needed in anticipation of an infrastructure device operation. At block 1220, an amount of allocated units for the infrastructure device operation is received. The amount of allocated units are generated based in part on the operation instance and an amount of units of the physical resource that is being generated and the amount of units of the physical resource that is reserved. At block 1230, processing of the amount of allocated units is initiated for the performing the infrastructure device operation.

Computing Environments and Context

Having identified various components of the distributed computing environments in FIGS. 1, 4, 7 and 10, it is noted that any number of components may be employed to achieve the desired functionality within the scope of the present disclosure. The various components of FIGS. 1, 4, 7 and 10 are shown with lines for the sake of clarity. Further, although some components of FIGS. 1, 4, 7 and 10 are depicted as single components, the depictions are exemplary in nature and in number and are not to be construed as limiting for all implementations of the present disclosure. The configuration management system functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With further reference to the resource management system, embodiments described herein can improve datacenter operations based on a resource management framework. The integrated components of the resource management framework refer to the hardware architecture and software framework that support functionality using the fiber optic cable network testing. The hardware architecture refers to physical components and interrelationships thereof and the software framework refers to software providing functionality that can be implemented with hardware operated on a device. The end-to-end software-based resource management framework can operate within the resource management system components to operate computer hardware to provide functionality described herein. As such, the components can manage resources and provide services for the resource management functionality. Any other variations and combinations thereof are contemplated with embodiments of the present invention.

By way of example, the resource management framework can include an API library that includes specifications for routines, data structures, object classes, and variables may support the interaction the hardware architecture of the device and the software framework of the testing platform. These APIs include configuration specifications for the resource management system such that the components therein can communicate with each other, as described herein.

Figure 13:
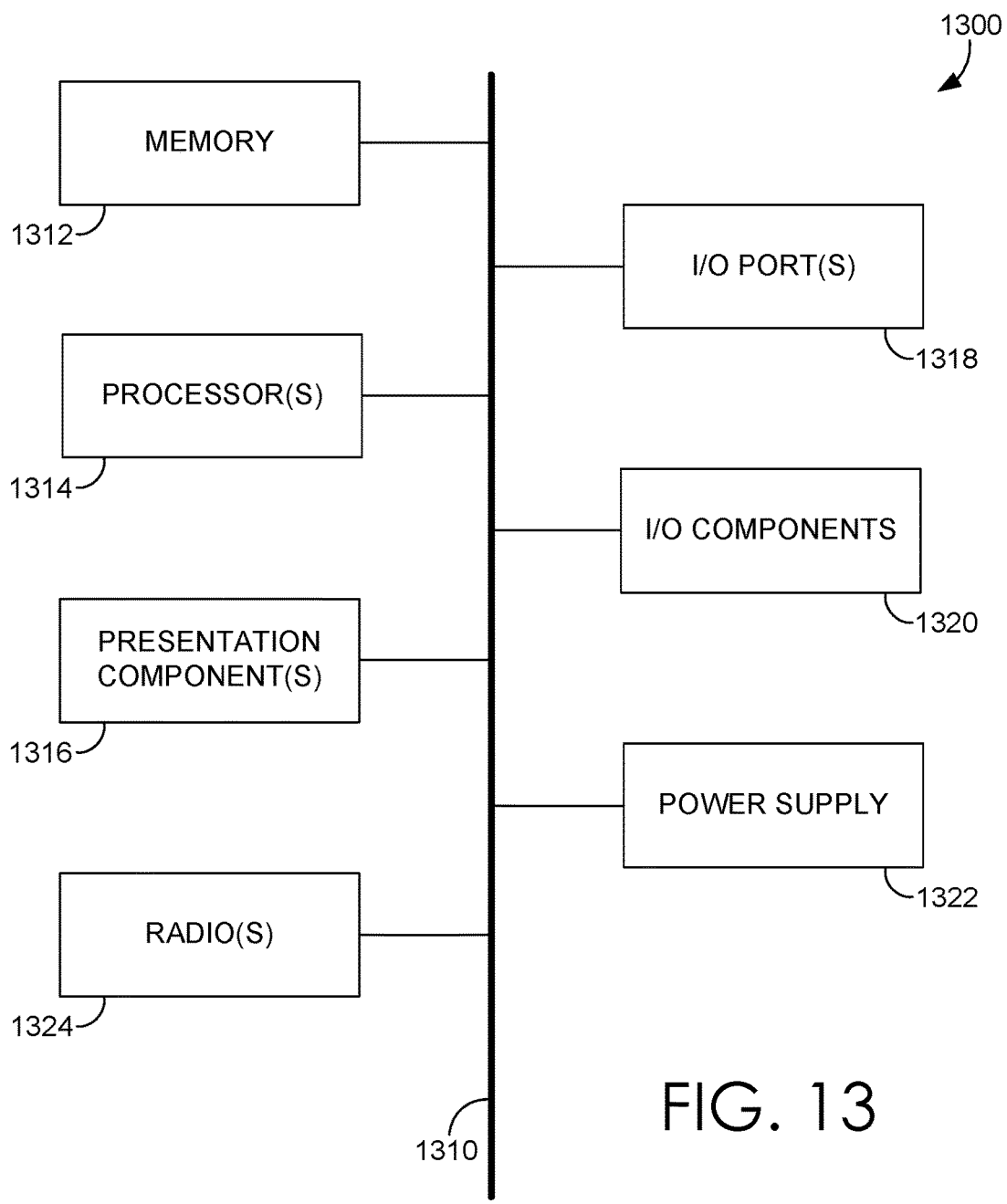
FIG. 13 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc.

Figure 14:
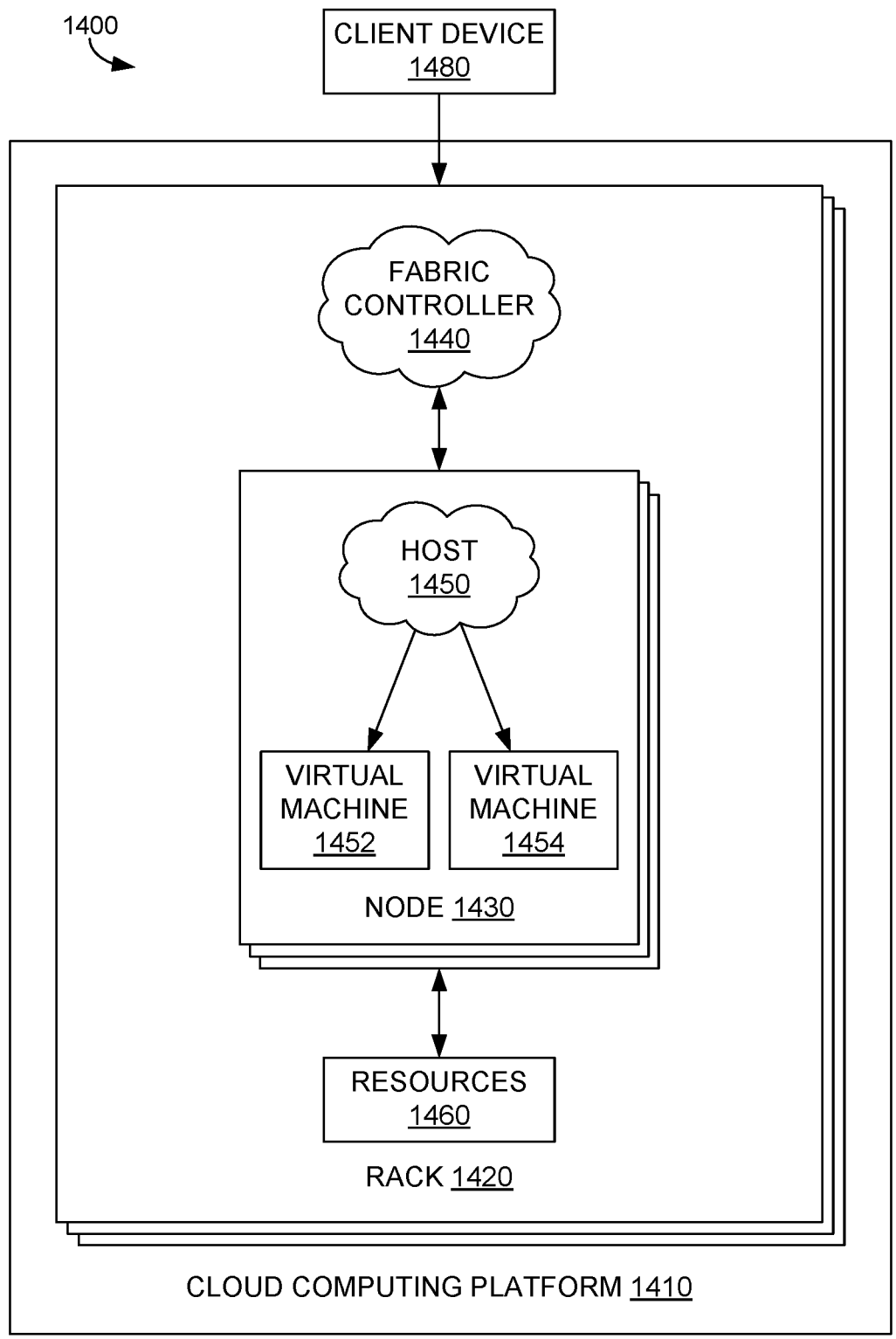
FIG. 14 is a block diagram of an exemplary computing environment suitable for use in implementing embodiments described herein.

Referring now to FIG. 14, FIG. 14 illustrates an exemplary distributed computing environment 1400 in which implementations of the present disclosure may be employed. In particular, FIG. 14 shows a high level architecture of the replicable differential store platform system ("system") comprising a cloud computing platform 1410, where the system supports optimizing database transactions. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 1400 that includes the cloud computing platform 1410, rack 1420, and node 1430 (e.g., computing devices, processing units, or blades) in rack 1420. The system can be implemented with a cloud computing platform 1410 that runs cloud services across different data centers and geographic regions. The cloud computing platform 1410 can implement a fabric controller 1440 component for provisioning and managing resource allocation, deployment, upgrade, and management of cloud services. Typically, the cloud computing platform 1410 acts to store data or run service applications in a distributed manner. The cloud computing infrastructure 1410 in a data center can be configured to host and support operation of endpoints of a particular service application. The cloud computing infrastructure 1410 may be a public cloud, a private cloud, or a dedicated cloud.

The node 1430 can be provisioned with a host 1450 (e.g., operating system or runtime environment) running a defined software stack on the node 130. Node 1430 can also be configured to perform specialized functionality (e.g., compute nodes or storage nodes) within the cloud computing platform 1410. The node 1430 is allocated to run one or more portions of a service application of a tenant. A tenant can refer to a customer utilizing resources of the cloud computing platform 1410. Service application components of the cloud computing platform 1410 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 1430, the nodes may be partitioned into virtual machines (e.g., virtual machine 1452 and virtual machine 1454). Physical machines can also concurrently run separate service applications. The virtual machines or physical machines can be configured as individualized computing environments that are supported by resources 1460 (e.g., hardware resources and software resources) in the cloud computing platform 1410. It is contemplated that resources can be configured for specific service applications. Further, each service application may be divided into functional portions such that each functional portion is able to run on a separate virtual machine. In the cloud computing platform 1410, multiple servers may be used to run service applications and perform data storage operations in a cluster. In particular, the servers may perform data operations independently but exposed as a single device referred to as a cluster. Each server in the cluster can be implemented as a node.

Client device 1480 may be linked to a service application in the cloud computing platform 1410. The client device 1480 may be any type of computing device, which may correspond to computing device 1300 described with reference to FIG. 13, for example. The client device 1480 can be configured to issue commands to cloud computing platform 1410. In embodiments, client device 1480 may communicate with service applications through a virtual Internet Protocol (IP) and load balancer or other means that directs communication requests to designated endpoints in the cloud computing platform 1410. The components of cloud computing platform 1410 may communicate with each other over a network (not shown), which may include, without limitation, one or more local area networks (LANs) and/or wide area networks (WANs).

Having described various aspects of the distributed computing environment 1400 and cloud computing platform 1410, it is noted that any number of components may be employed to achieve the desired functionality within the scope of the present disclosure. Although the various components of FIG. 14 are shown with lines for the sake of clarity, in reality, delineating various components is not so clear, and metaphorically, the lines may more accurately be grey or fuzzy. Further, although some components of FIG. 14 are depicted as single components, the depictions are exemplary in nature and in number and are not to be construed as limiting for all implementations of the present disclosure.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

For detailed discussion purposes, the resource management system 100 is described as a mechanism associated with an infrastructure (e.g., datacenter 120A running the plurality of devices 120). A mechanism as used herein refers to any device, process, or service or combination thereof. A mechanism may be implemented using components as hardware, software, firmware, a special-purpose device, or any combination thereof. A mechanism may be integrated into a single device or it may be distributed over multiple devices. The various components of a mechanism may be co-located or distributed. The mechanism may be formed from other mechanisms and components thereof. The components of the resource management system 100 facilitate providing functionality described herein.

For purposes of a detailed discussion above, embodiments are described with reference to distributed computing devices, components, and a resource management system components. Components can be configured to perform novel aspects of embodiments described herein, where "configured to" includes components that are programmed to perform particular tasks or implement particular abstract data types using computer code. It is contemplated that the methods described herein can be performed in different types of operating environments having alternate configurations of the functional components described herein. As such, the embodiments described herein are merely exemplary, and it is contemplated that the techniques may be extended to other implementation contexts.

For purposes of this disclosure, the word "including" has the same broad meaning as the word "comprising," and the word "accessing" involves "receiving," "referencing," or "retrieving." In addition, words such as "a" and "an," unless otherwise indicated to the contrary, include the plural as well as the singular. Further the word "communicating" has the same broad meaning as the word "receiving," or "transmitting" facilitated by software or hardware-based buses, receivers, or transmitters" using communication media described herein. Thus, for example, the constraint of "a feature" is satisfied where one or more features are present. Also, the term "or" includes the conjunctive, the disjunctive, and both (a or b thus includes either a or b, as well as a and b).

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computing system for supporting infrastructure resource management in a datacenter, the computing system comprising:
  a processor and a memory containing instructions executable by the processor to cause the computing system to:
    receive infrastructure device data for an infrastructure device configured to consume a physical resource of an infrastructure in the datacenter;
    generate, based on the received infrastructure device data, an operation instance having a plurality of attributes corresponding to the infrastructure device, the operation instance comprising requested units that indicate an amount of a physical resource needed in anticipation of an infrastructure device operation to be performed by the infrastructure device;
    communicate operation instructions to one or more additional infrastructure devices for an amount of units of the physical resource to be generated and an amount of units of the physical resource to be reserved based on the generated operation instance and a threshold reserve of the physical resource to ensure proper operation of the infrastructure;
    determine an amount of allocated units of the physical resource to the infrastructure device for the infrastructure device operation based in part on the generated operation instance and an amount of units of the physical resource that is being generated and the amount of units of the physical resource that is reserved by the one or more additional infrastructure devices; and communicate operation instructions to the infrastructure device to begin the infrastructure device operation, thereby consuming the amount of allocated units of the physical resource with the infrastructure device.

2. The computing system of claim 1, wherein the memory contains additional instructions executable by the processor to cause the computing system to automatically update an amount of allocable units of the physical resource based on the amount of units of the physical resource that is being generated and an amount of units of the physical resource that is reserved.

3. The computing system of claim 1, wherein the physical resource is generated based on the one or more additional infrastructure devices producing the physical resource or the one or more additional infrastructure devices throttling usage of the physical resource such that an unused portion of the physical resource is made available for consumption via the datacenter.

4. The computing system of claim 1, wherein the memory contains additional instructions executable by the processor to cause the computing system to generate, based on the infrastructure device data, a device instance having a plurality of attributes associated with the infrastructure device, the device instance comprising a generation capacity of units of a physical resource and reserve units of the physical resource, wherein the device instance is a computed representation of the infrastructure device in relation to the physical resource and a reserve of the physical resource, and wherein the device instance supports determining allocable units of the physical resource.

5. The computing system of claim 1, wherein the memory contains additional instructions executable by the processor to cause the computing system to:

receive the infrastructure device data that is used in determining the amount of the requested units needed for the anticipated infrastructure device operation;

transmit data representing the amount of allocated units for the infrastructure device operation; and initiate processing of the amount of allocated units for the performing the infrastructure device operation.

6. The computing system of claim 1, wherein the infrastructure device is an electrical appliance that is associated with the infrastructure operating as a building facility, and wherein the one or more additional infrastructures device are computing devices within the building; or wherein the infrastructure device is an electrical grid device that is associated with the infrastructure operating based on an electric grid, a grid connector, or a datacenter, and wherein the one or more additional infrastructure devices are power devices in the datacenter.

7. The computing system of claim 1, wherein the memory contains additional instructions executable by the processor to cause the computing system to:

receive a request having requested units for compute resources from an external consumer;

transmit, from the infrastructure, an amount of allocated units of compute resources based on an amount of units of the one or more physical resources that are being generated and an amount of units of the one or more physical resources that are reserved in response to the received request; and execute a compute workload in the infrastructure to utilize the amount of allocated units of compute resources.

8. A computer-implemented method for infrastructure resource management in a datacenter, the method comprising:

receiving infrastructure device data from an infrastructure device configured to consume a physical resource in the datacenter;

generating, based on the infrastructure device data, an operation instance having a plurality of attributes corresponding to the infrastructure device, the operation instance comprising requested units that indicate an amount of a physical resource needed in anticipation of an infrastructure device operation to be performed by the infrastructure device;

communicating operation instructions to one or more additional infrastructure devices an amount of units of the physical resource to be generated and an amount of units of the physical resource to be reserved, based on the generated operation instance and a threshold reserve of the physical resource associated with operating the one or more additional infrastructure devices in the datacenter;

determine an amount of allocated units of the physical resources to the infrastructure device based in part on the generated operation instance and an amount of units of the physical resource that is being generated and the amount of units of the physical resource that is reserved; and communicating operation instructions to the infrastructure device to begin the infrastructure device operation, thereby consuming the amount of allocated units of the physical resource with the infrastructure device.

9. The method of claim 8, further comprising automatically updating an amount of allocable units of the physical resource based on the amount of units of the physical resource that is being generated and the amount of units of the physical resource that is reserved in the infrastructure.

10. The method of claim 8, wherein the physical resource is generated based on the one or more additional infrastructure devices producing the physical resource.

11. The method of claim 8, wherein the physical resource is generated based on the infrastructure device throttling usage of the physical resource such that an unused portion of the physical resource is made available for consumption via the datacenter.

12. The method of claim 8, further comprising generating, based on the infrastructure device data, a device instance having a plurality of attributes corresponding to the infrastructure device, the device instance comprising a generation capacity of units of a physical resource and reserve units of the physical resource.

13. The method of claim 8, further comprising communicating a notification to actuate one or more physical devices within the infrastructure to initiate processing the amount of allocated units of the physical resource.

14. The method of claim 8, further comprising:

receiving, from a remote consumer, a request having requested units for compute resources;

generating an amount of allocated units of compute resources based on an amount of units of the one or more physical resources that are being generated and an amount of units of the one or more physical resources that are reserved;

communicating the amount of units of compute resources to the remote consumer; and receiving a compute workload to utilize the amount of allocated units of compute resources.

15. The method of claim 8, wherein generating the physical resource is based on an Application Programming Interface that supports a protocol for processing the allocated physical resources based on the infrastructure device in relation to the physical resource and a reserve of the physical resource.

16. A method for infrastructure management in a datacenter, the method comprising:

communicating, from an infrastructure device, infrastructure device data to a computing device that generates operation instances having a plurality of attributes associated with the infrastructure device, the operation instance comprising a number of requested physical resource units that indicate an amount of a physical resource needed in anticipation of an infrastructure device operation by the infrastructure device;

receiving, from the computing device, an amount of allocated units of the requested physical resource for the infrastructure device operation, wherein the amount of allocated units are generated based in part on the operation instance and an amount of units of the physical resource that is being generated and the amount of units of the physical resource that is reserved to ensure proper operation of the datacenter; communicating a notification to actuate one or more physical devices within an operating infrastructure of the datacenter that is the operating environment of the infrastructure device, to initiate operation processes for the processing the amount of allocated units of the physical resource and consuming, at the infrastructure device, the amount of allocated units of the physical resource for performing the infrastructure device operation, wherein the physical resource is selected from one of power, water, carbon dioxide, or heat.

17. The method of claim 16, wherein the request is generated based on infrastructure device data of the infrastructure device that is associated with the physical resource.

18. The method of claim 17, wherein the operating infrastructure is selected from one of a power grid, a co-located agricultural facility, a manufacturing facility, a building, or another datacenter.

19. The method of claim 16, further comprising communicating operation instructions to one or more additional infrastructure devices an amount of units of the physical resource to be generated and an amount of units of the physical resource to be reserved, based on the operation instance and a threshold reserve of the physical resource associated with operating the one or more additional infrastructure devices.

* * * * *